(12) United States Patent
Nogami et al.

(10) Patent No.: US 11,601,582 B2
(45) Date of Patent: Mar. 7, 2023

(54) IMAGE TRANSMISSION APPARATUS AND IMAGE TRANSMISSION METHOD

(71) Applicant: SONY CORPORATION, Tokyo (JP)

(72) Inventors: Kazuki Nogami, Kanawaga (JP); Makoto Noguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 611 days.

(21) Appl. No.: 16/324,645

(22) PCT Filed: Jun. 2, 2017

(86) PCT No.: PCT/JP2017/020625
§ 371 (c)(1),
(2) Date: Feb. 11, 2019

(87) PCT Pub. No.: WO2018/042794
PCT Pub. Date: Mar. 8, 2018

(65) Prior Publication Data
US 2021/0281899 A1    Sep. 9, 2021

(30) Foreign Application Priority Data

Aug. 30, 2016  (JP) .............................. JP2016-168025

(51) Int. Cl.
*H04N 21/231* (2011.01)
*H04N 21/24* (2011.01)
(Continued)

(52) U.S. Cl.
CPC ....... *H04N 5/232* (2013.01); *H04N 21/23106* (2013.01); *H04N 21/2407* (2013.01); *H04N 21/262* (2013.01)

(58) Field of Classification Search
CPC ............. H04N 21/262; H04N 21/2407; H04N 21/23106; H04N 5/232; H04N 5/23222;
(Continued)

(56) References Cited

U.S. PATENT DOCUMENTS

| | | | | |
|---|---|---|---|---|
| 2009/0144785 A1* | 6/2009 | Walker | ................... | H04N 5/262 725/105 |
| 2011/0179445 A1* | 7/2011 | Brown | ................... | G11B 27/28 725/32 |
| 2015/0256899 A1* | 9/2015 | Chand | ................... | H04N 21/812 725/34 |

FOREIGN PATENT DOCUMENTS

| | | |
|---|---|---|
| JP | 2002-261710 A | 9/2002 |
| JP | 2003-078901 A | 3/2003 |

(Continued)

OTHER PUBLICATIONS

International Search Report and Written Opinion of PCT Application No. PCT/JP2017/020625, dated Aug. 29, 2017, 06 pages of ISRWO.

*Primary Examiner* — Benjamin R Bruckart
*Assistant Examiner* — Tien M Nguyen
(74) *Attorney, Agent, or Firm* — Chip Law Group

(57) ABSTRACT

To appropriately prevent an image with disadvantageous or inappropriate imaged content from being transmitted when such imaged content is generated in a use case such as real-time distribution of a captured image, and to prevent mistrust of a viewer due to malfunction or the like. Therefore, a transmission unit is caused to execute transmission of a first image that is delayed by a delay processing unit. If a switching trigger is detected during this time, the image that the transmission unit is caused to transmit is switched from a first image to a second image that is reproduced by a reproduction unit.

10 Claims, 14 Drawing Sheets

(51) Int. Cl.
*H04N 21/262* (2011.01)
*H04N 5/232* (2006.01)

(58) Field of Classification Search
CPC ........... H04N 5/23218; H04N 21/4542; H04N 21/8549
See application file for complete search history.

(56) References Cited

FOREIGN PATENT DOCUMENTS

| | | |
|---|---|---|
| JP | 2003-309829 A | 10/2003 |
| JP | 2004-248150 A | 9/2004 |
| JP | 2010-062621 A | 3/2010 |

* cited by examiner

IMAGE TRANSMISSION APPARATUS AND IMAGE TRANSMISSION METHOD

CROSS REFERENCE TO RELATED APPLICATIONS

This application is a U.S. National Phase of International Patent Application No. PCT/JP2017/020625 filed on Jun. 2, 2017, which claims priority benefit of Japanese Patent Application No. JP 2016-168025 filed in the Japan Patent Office on Aug. 30, 2016. Each of the above-referenced applications is hereby incorporated herein by reference in its entirety.

TECHNICAL FIELD

The present technology relates to an image transmission apparatus, an image transmission method, and a program and particularly to a technical field related to streaming transmission of image signals.

BACKGROUND ART

In recent years, a video camera or the like capable of live distribution, through a network, of image content such as a moving image or a stationary image that is being captured has become known as described in Patent Literature 1 listed below.

Also, services capable of real-time distribution of images to an unspecified large number of persons have also been widely used.

Note that, transmission of a face image using an image captured in advance instead of a real-time image of a speaker in a television telephone is described in Patent Literature 2 listed below.

A technology of extracting an appropriate section as a digest image from a moving image is disclosed in Patent Literature 3 listed below.

CITATION LIST

Patent Literature

Patent Literature 1: JP 2003-78901A
Patent Literature 2: JP 2003-309829A
Patent Literature 3: JP 2010-62621A

SUMMARY OF INVENTION

Technical Problem

Incidentally, when streaming distribution of a real-time moving image captured by a video camera, for example, is considered, there is a concern that inappropriate images may be captured during the distribution.

Inappropriate images described herein include various images such as images that that are so-called broadcasting accidents, images of scenes that persons who capture the images or distributers do not want to transmit, although the images are typically considered not to have problems, and images that would better not be distributed from the viewpoint of protection of individual information.

There is a problem that in a case in which such an inappropriate image is captured during real-time streaming distribution, the inappropriate image is partially distributed during a period until the distribution is stopped even if an image-capturing person immediately notice the inappropriate image and stops the distribution.

Also, if the distribution itself is stopped, image reproduction is not performed on the terminals of viewers, and a state of a black image is brought about. The viewers may also mistake the state as malfunction of the devices.

Thus, an object of the present technology is to enable more appropriate prevention of transmission of inappropriate images and to prevent viewers from mistaking interruption of distribution as a malfunction or the like.

Solution to Problem

According to the present technology, an image transmission apparatus includes: a delay processing unit that causes a first image to be delayed by a predetermined time; a reproduction unit that reproduces a second image; a transmission unit that transmits an image; and a control unit that performs switching from the first image to the second image that is reproduced by the reproduction unit and causes the second image to be transmitted if a switching trigger is detected while the first image that is caused to be delayed by the delay processing unit is being transmitted.

For example, streaming transmission (network distribution) of a first image will be considered. This first image is caused to be delayed by a predetermined time and is then transmitted. The predetermined time is a time with which real-time properties are not significantly degraded and is also a time which is a margin in which a person can complete operations in accordance with the image content before transmission reaches this image content after a person recognizes certain image content in a movie. For example, the predetermined time may be assumed to be several seconds to several tens of seconds or about 1 minute. The movie to be transmitted is switched from the first image to a second image by a control unit performing control in accordance with a user's operation (generation of a switching trigger caused by the operation). Further, the movie that is being transmitted is switched from the first image that is caused to be delayed to the second image (reproduced image)

It is also considered that the image transmission apparatus according to the present technology includes an imaging unit, and the first image is an image that is captured by the imaging unit.

That is, the image transmission apparatus is realized as an imaging device. Further, it is assumed that streaming transmission or the like of a movie that is being captured by the imaging unit is performed. In that case, the first image as the captured movie is caused to be delayed by a predetermined time and is then transmitted.

With regard to the image transmission apparatus according to the present technology, it is also considered that the control unit performs control such that switching to the second image is performed and the second image is caused to be transmitted without waiting for completion of transmission of a frame of the first image immediately before the switching trigger is detected in accordance with the detection of the trigger.

Since the first image is caused to be delayed and is then transmitted, it is typically considered that the transmission up to a frame immediately before a timing at which the switching trigger is generated has not yet been completed at a timing at which the switching trigger is detected. However, switching to the transmission of the second image is performed immediately after the switching trigger is detected without waiting for transmission of unsent frames.

With regard to the image transmission apparatus according to the present technology, it is also considered that the control unit performs control such that the control unit performs switching to the first image and causes the first image to be transmitted at a time point when a delay time of the delay processing unit has elapsed after detection of a transmission restarting trigger for the first image in accordance with the detection of the transmission restarting trigger.

Since the first image is caused to be delayed and is then transmitted, an image in a frame at a point before a transmission restarting trigger is transmitted if a selection unit is set to transmit the first image immediately at the timing at which the transmission restarting trigger for the first image is detected. In order to avoid such a situation, control is performed such that the first image is transmitted by the selection unit after waiting for a delay time.

It is also considered that the image transmission apparatus according to the present technology includes a digest image generation unit that generates a digest image for the first image and causes a recording medium to store the digest image, and the control unit causes the reproduction unit to reproduce the digest image in a period during which the second image is caused to be transmitted in accordance with the switching trigger.

For the input first image, a digest image is generated and stored in real time. In a case in which the transmission is switched from the first image to the second image, then the digest image is reproduced and transmitted as the second image.

With regard to the image transmission apparatus according to the present technology, it is also considered that the digest image is generated from the first image excluding a period from a time point at which the switching trigger is detected to a time point at which a transmission restarting trigger for the first image is detected.

That is, the image of the first image in a period during which the transmission is stopped is not included in the digest image.

With regard to the image transmission apparatus according to the present technology, it is also considered that processing of recording the first image in a recording medium is performed, and the digest image is generated using the first image after a frame of which the recording in the recording medium is started.

The first image is an image acquired by imaging, for example, and is recorded in a recording medium. The digest image is an image after a point at which the recording has started.

With regard to the image transmission apparatus according to the present technology, it is also considered that the digest image is generated using the first image after a frame that is a target of transmission by the transmission unit.

For the first image (for example, an image acquired by imaging), a digest image is generated from an image after a frame that is a target of transmission.

With regard to the image transmission apparatus according to the present technology, it is also considered that the control unit causes the reproduction unit to reproduce an existing movie that is recorded in advance in the recording medium in a case in which the control unit performs switching to the second image and causes the second image to be transmitted in accordance with the switching trigger.

A movie that will be transmitted at the time that the switching trigger is generated and that replaces the first image is prepared in advance. In a case in which the transmission is switched from the first image to the second image, the prepared existing movie is reproduced and transmitted as the second image.

With regard to the image transmission apparatus according to the present technology, it is also considered that a plurality of existing movies is respectively stored together with pieces of category information, and the control unit causes the reproduction unit to reproduce an existing movie that is selected depending on a result of comparing a piece of category information determined from image content of the first image with the pieces of category information of the respective existing movies in a case in which the control unit performs switching to the second image and causes the second image to be transmitted in accordance with the switching trigger.

Category information indicating a category or the like of movie content is applied to the existing movie prepared in advance. Also, the control unit determines a category of the first image. In a case in which the transmission is switched from the first image to the second image, then the existing movie that corresponds to the first image is caused to be reproduced as the second image.

With regard to the image transmission apparatus according to the present technology, it is also considered that the control unit performs control such that the control unit causes the reproduction unit to reproduce an existing movie that is stored in advance in the recording medium and then causes the reproduction unit to reproduce the digest image in a period during which the second image is caused to be transmitted.

That is, the existing movie and the digest image are successively reproduced and transmitted as the second image.

With regard to the image transmission apparatus according to the present technology, it is also considered that the control unit performs control such that the digest image is being reproduced by the reproduction unit in a period from a time point at which the transmission restarting trigger for the first image is detected to a time point at which a delay time of the delay processing unit has elapsed from the detection of the transmission restarting trigger.

For example, the digest image is reproduced as the second image in response to the transmission restarting trigger. Alternatively, the digest image is reproduced before the transmission restarting trigger is detected. Then, the state in which the digest image is transmitted is maintained until the selection state is switched from that of the second image to that of the first image by the selection unit.

According to the present technology, an image transmission method of an image transmission apparatus including the delay processing unit, the reproduction unit, and the transmission unit, executes: a procedure of causing the first image that is delayed by the delay processing unit to be transmitted; a procedure of detecting a switching trigger; and a procedure of performing switching to the second mage that is reproduced by the reproduction unit and causing the second image to be transmitted in accordance with the detection of the switching trigger.

The program according to the present technology is a program that causes a control device in an image transmission apparatus to execute the aforementioned respective procedures.

Advantageous Effects of Invention

According to the present technology, it is possible to perform switching to transmission of the second image with a margin and to more effectively prevent an inappropriate image from being transmitted in a case in which an inappropriate scene is discovered during transmission of the first image. In addition, since the viewer continues to be able to view a moving image, this state is not mistaken for a malfunction of a device or the like.

Note that the effects described herein are not necessarily limited, and any of the advantages described in the present disclosure may be achieved.

DESCRIPTION OF EMBODIMENTS

Hereinafter, an embodiment will be described in the following order.
<1. Streaming distribution system>
<2. Configuration of imaging device that serves as image transmission apparatus>
<3. Image transmission operation>
<4. Processing examples>
<5. Other examples of image transmission apparatus>
<6. Conclusion and modification examples>

Note that an image obtained using a captured image signal that is captured by an imaging device is assumed to be an example of the first image described in the claims and an image obtained using a reproduced image signal that is reproduced from a recording medium is assumed to be an example of the second image in the embodiment. The captured image signal will also simply be referred to as a "captured image", and the reproduced image signal will also simply be referred to as a "reproduced image".

1. Streaming Distribution System

Figure 1:
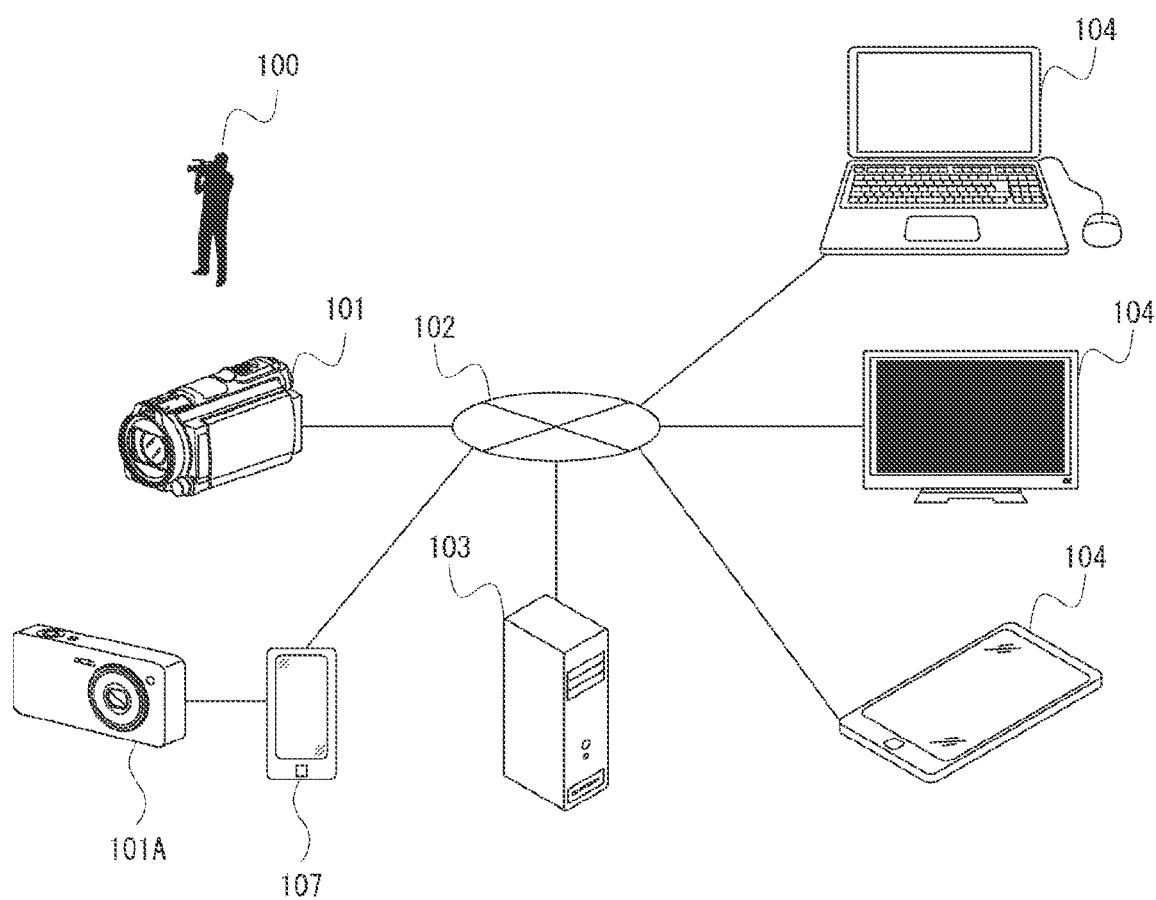
FIG. 1 is a block diagram of a distribution system according to an embodiment of the present technology.

FIG. 1 illustrates a configuration example of a streaming distribution system that includes an image transmission apparatus according to an embodiment.

The streaming distribution system is a system capable of streaming distribution of an image captured by an imaging device 101 in real time.

The imaging device 101 is a so-called video camera and has functions of transmitting a captured image substantially in real time and transmitting a movie (reproduced image) that is reproduced from an internal recording medium.

A network 102 is a communication network such as the Internet, for example. The network 102 is not limited to the Internet and may be a local area network (LAN), a virtual private network, an intranet, an extranet, a telephone line network, a mobile communications network, a satellite communications network, or the like or may be a community antenna television (CATV) communication network or the like. The network 102 may be any communication network as long as non-specific or specific users can utilize the network.

A distribution management server 103 is a server that manages and executes streaming distribution. The distribution management server 103 performs processing of receiving a movie from a distribution source (imaging device 101) via the network 102 and distributing the movie to a terminal apparatus 104 that has provided a request.

The terminal apparatus 104 is an information processing apparatus which is operated by a non-specific or specific user. For example, this may be assumed to be a personal computer (PC) provided with a communication function, a television image receiver, a mobile terminal apparatus such as a smartphone or a tablet terminal, or the like.

An image-capturing person 100 captures a moving image using the imaging device 101. The imaging device 101 transmits the captured image to the distribution management server 103 via the network 102.

The user who is a viewer can view the movie that is streaming-distributed by the terminal apparatus 104. In a case in which the user desires to view the streaming-distributed image, the user performs an operation of transmitting a distribution request from the terminal apparatus 104 to the distribution management server 103.

The distribution management server 103 distributes the movie that is transmitted from the imaging device 101 in response to the request from the terminal apparatus 104. The terminal apparatus 104 causes the received movie to be displayed. In this manner, the user who uses the terminal apparatus 104 can view the captured image that is being captured by the imaging device 101 (a scene that is being currently captured by the image-capturing person 100) substantially in real time.

Note that although the expression "substantially in real time" also means that an image is not viewed in real time in a strict sense due to a time difference caused in the course of distribution, in the embodiment, the imaging device 101 also causes the captured image to be delayed by a predetermined time and transmits the captured image. In the embodiment, it is assumed that a delay time of about 5 seconds to 30 seconds or a maximum of about 1 minutes is provided.

However, since a delay of this extent is a delay that can be recognized as real-time viewing from the viewpoint of the sense of a user, this is expressed as "substantially in real time".

In the aforementioned system, the imaging device 101 is an embodiment of the image transmission apparatus described in the claims.

Also, FIG. 1 illustrates, as examples, an imaging device 101A and an image transmission apparatus 107. This is an example of a case in which the image transmission apparatus 107 is an embodiment of the image transmission apparatus described in the claims.

The imaging device 101A serves as a so-called video camera and has a function of capturing a movie. An imaging signal obtained by the imaging device 101A is transmitted to the image transmission apparatus 107.

The image transmission apparatus 107 has a function of transmitting a captured image that is supplied from the imaging device 101A and a movie (reproduced image) that is reproduced from an internal recording medium to the distribution management server 103 via the network 102 for streaming distribution.

Operations of the imaging device 101A and the image transmission apparatus 107 will be described later with reference to FIG. 14.

2. Configuration of Imaging Device that Serves as Image Transmission Apparatus A configuration example of the imaging device 101 illustrated in FIG. 1, that is, the imaging device 101 as an example of the image transmission apparatus described in the claims will be described with reference to FIG. 2.

Figure 2:
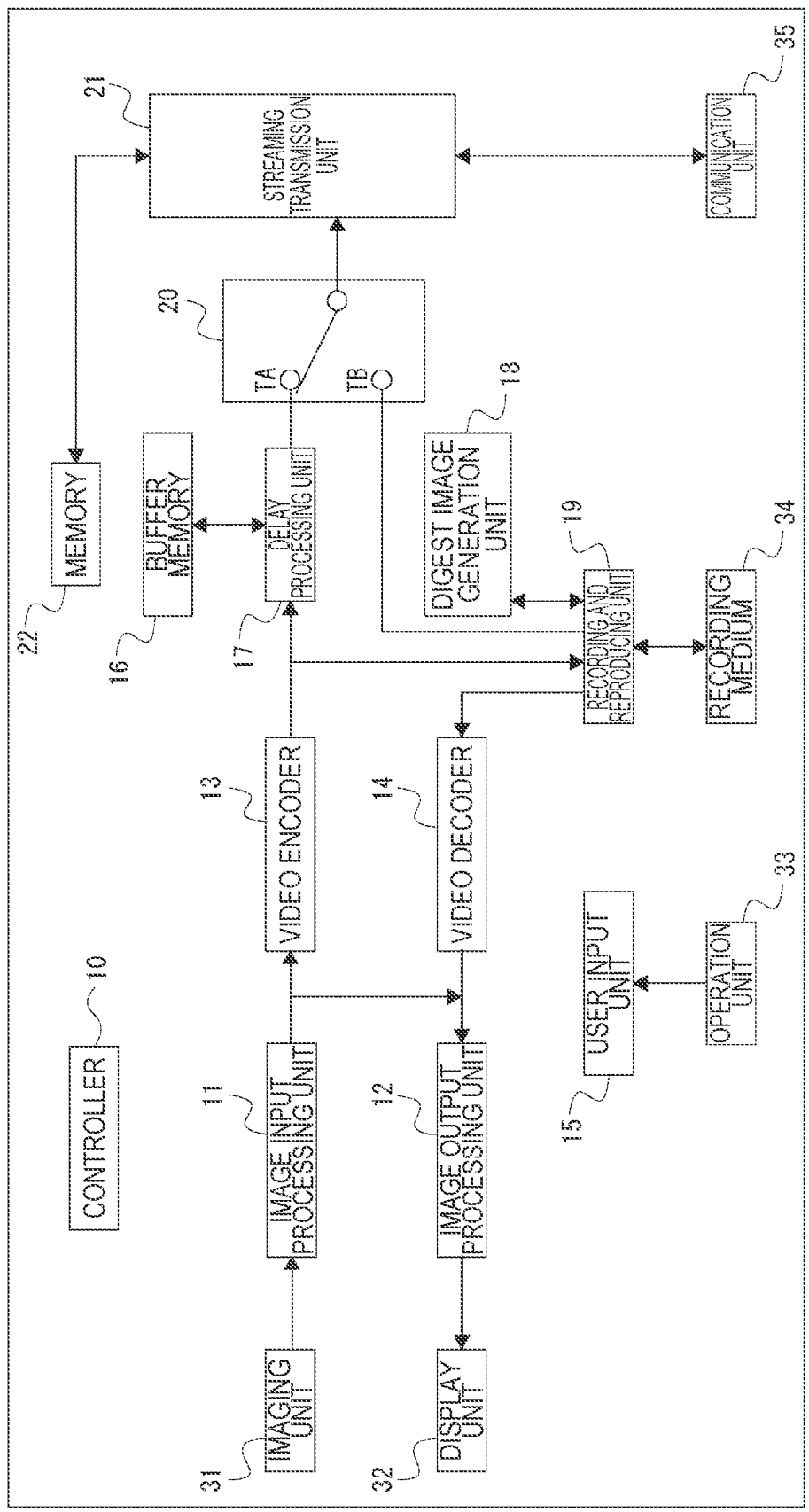
FIG. 2 is a block diagram of an imaging device that is an embodiment of an image transmission apparatus.

As illustrated in FIG. 2, the imaging device 101 has an imaging unit 31. The imaging unit 31 has an optical system and an imager. For the optical system, lenses such as a cover lens, a zoom lens, and a focus lens and a diaphragm mechanism, for example, are provided. Light from an object is collected at the imager by the optical system. The imager has an imaging element of a complementary metal oxide semiconductor (CMOS) type, a charge coupled device (CCD) type, or the like, for example. The imager executes, for example, correlated double sampling (CDS) processing, automatic gain control (AGC) processing, and the like and further performs analog/digital (A/D) conversion processing on an electrical signal obtained through photoelectric conversion of the imaging element. Then, the imaging signal as digital data is output to an image input processing unit 11 in a later stage.

The image input processing unit 11 performs various kinds of signal processing on the imaging signal (moving image data) input from the imaging unit 31. For example, the image input processing unit 11 performs clamping processing of clamping black levels of R, G, and B in predetermined levels, correction processing among color channels of R, G, and B, and the like on the imaging signal. Also, a luminance (Y) signal and a color (C) signal are generated (separated) from the image data of R, G, and B, and necessary resolution conversion processing is executed in accordance with a purpose such as storage, display, or transmission.

The video encoder 13 performs necessary encoding processing on the imaging signal. For example, encoding processing for recording is performed in order to record the image data as an imaging signal in the recording medium 34.

The recording and reproducing unit 19 performs recording and reproducing operations on the recording medium 34.

Various actual forms can be conceived for the recording and reproducing unit 19 and the recording medium 34. For example, the recording medium may be a flash memory that is incorporated in the imaging device 101, and the recording and reproducing unit 19 may be a memory controller that performs reading/writing thereon.

In addition, the recording medium 34 may be a memory card (for example, a portable flash memory) that can be attached to and detached from the imaging device 101, and the recording and reproducing unit 19 may be a card recording and reproducing unit that allows recording and reproduction access to the memory card.

Also, the recording and reproducing unit 19 and the recording medium 34 may be realized as a hard disk drive (HDD) in some cases.

The recording and reproducing unit 19 can record various kinds of data in the recording medium and reproduce various kinds of data recorded in the recording medium 34 in response to a command from a controller 10, which will be described later.

For example, the recording and reproducing unit 19 performs processing of recording a captured image that has been encoded for recording by the video encoder 13 in the recording medium 34.

Also, the recording and reproducing unit 19 performs processing of reproducing movie data (referred to as an "existing movie" for the purpose of description) that is recorded in advance in the recording medium 34. Also, the recording and reproducing unit 19 performs processing of reproducing a captured image recorded in the recording medium 34.

In addition, the recording and reproducing unit 19 also performs reading of a captured image for generating a digest image with the digest image generation unit 18, which will be described later, from the recording medium 34, recording of the generated digest image in the recording medium 34, and further reproduction of the digest image from the recording medium 34.

The video decoder 14 performs decoding processing of image data that is reproduced and transferred from the recording medium 34 by the recording and reproducing unit 19. That is, the video decoder 14 decodes the captured image, the existing movie, the digest image, and the like in a case in which the captured image, the existing movie, the digest image and the like are reproduced from the recording medium 34. Then, the decoded image data is transferred to the image output processing unit 12.

The image output processing unit 12 performs processing for outputting display on the display unit 32 that is provided in the imaging device 101.

The display unit 32 is a display unit that performs various kinds of display for the image-capturing person 100 and is formed to have a display device such as a liquid crystal display (LCD) or an organic electro-luminescence (EL) display formed on a case body of the imaging device 101, for example. Note that the display unit 32 may be formed using an LCD, an organic EL display, or the like in a form of a so-called view finder.

The image output processing unit 12 performs processing as a display driver that causes the display unit 32 to perform display. That is, the image output processing unit 12 causes the display unit 32 to execute various kinds of display on the basis of a command from the controller 10. For example, the image output processing unit 12 drives the display unit 32 and causes the display unit 32 to display the reproduced movie on the basis of the image data that is reproduced from the recording medium 34 and is decoded by the video decoder 14.

In addition, image data of the captured image that has converted to have a resolution for display by the image input processing unit 11 is supplied to the image output processing unit 12. The image output processing unit 12 causes the display unit 32 to display a so-called through image (a monitoring image of an object) that is being imaged, by driving the display unit 32 on the basis of the image data of the captured image in accordance with a command from the controller 10.

Also, the image output processing unit 12 causes display of various operation menus, icons, messages, and the like, that is, display of a graphical user interface (GUI) to be executed on the screen on the basis of a command from the controller 10.

The operation unit 33 collectively indicates an input device for the imaging unit 31 inputting various operations. The user input unit 15 detects an operation performed on the operation unit 33 and sends a signal in accordance with an input operation to the controller 10.

The operation unit 33 is realized, for example, as various operation pieces provided on the case body of the imaging device 101, a touch pad, a touch panel formed in the display unit 32, or the like.

As the operation pieces on the case body, a reproduction menu activation button, an enter button, a cross key, a cancel button, a zoom key, a slide key, a shutter button (release button), a focus ring, and the like are considered.

Also, various operations may be able to be performed through touch panel operations using icons, menus, and the like that the touch panel and the display unit 32 are caused to display.

Alternatively, there is also a mode in which user's tapping operations are detected by a touch pad or the like.

Further, there is also case in which a separate remote controller is used as the operation unit 33.

In the embodiment, in particular, each of operation pieces for providing a stand-by (starting to capture an image using the imaging unit 31) command, an imaging starting (starting to record an imaging signal in the recording medium) command, and a transmission starting (starting streaming transmission) command is prepared as one part of the operation unit 33.

Also, an operation piece for causing a switching trigger and a captured image transmission restarting trigger, which will be described later, to be generated is prepared as one part of the operation unit 33.

A delay processing unit 17 performs delay processing using a buffer memory 16 on image data as a captured image.

That is, the delay processing unit 17 writes image data output from the video encoder 13 in the buffer memory 16 and performs buffering for a specific time. After the specific time elapses, the delay processing unit 17 reads the image data from the buffer memory 16 and outputs the image data to a first input terminal TA of a selector unit 20. That is, the delay processing unit 17 causes the image data of the captured image to be delayed using the buffering time as the delay time.

The selector unit 20 selects any of the first input terminal TA and a second input terminal TB in response to a command from the controller 10 and supplies the input image data to a streaming transmission unit 21.

The image data (reproduced image) reproduced from the recording medium 34 is supplied to the second input terminal TB by the recording and reproducing unit 19.

The streaming transmission unit 21 acquires transmission destination information such as an IP address and a port number necessary for the transmission via the network from the memory 22 and then performs packet processing necessary for streaming on the image data input from the selector unit 20.

A communication unit 35 communicates with various devices such as the distribution management server 103 via the network 102.

The image data after being subjected to the packet processing by the streaming transmission unit 21 is streaming transmitted to a target transmission destination, for example, the distribution management server 103 via the communication unit 35.

Therefore, image data of any of the captured image (first image) and the reproduced image (second image) selected by the selector unit 20 is streaming transmitted.

The digest image generation unit 18 extracts a characteristic scene in content of movie that is a captured image, for example, and generates a digest image as a movie or a stationary image on the basis of the captured image recorded in the recording medium 34 by the recording and reproducing unit 19. Then, the recording and reproducing unit 19 is caused to record the generated digest image in the recording medium 34.

Various methods of generating the digest image can be conceived, and the method disclosed in Patent Literature 3 listed above, for example, can be used.

The controller 10 is configured with a microcomputer (arithmetic processing device) that is provided with a central processing unit (CPU), a read only memory (ROM), a random access memory (RAM), a flash memory and the like.

The CPU collectively controls the entire imaging device 101 by executing programs stored in the ROM, the flash memory, and the like.

The RAM serves as a working region for various kinds of data processing of the CPU and is used for temporarily storing data, programs, and the like.

The ROM and the flash memory (nonvolatile memory) are used to store an operating system for the CPU controlling the respective parts, content files such as image files, application programs for various operations, firmware, and the like. In the example, in particular, a program for executing processing for streaming transmission, which will be described later, is also stored therein. Note that the program for causing the controller 10 to execute the processing for streaming transmission may be stored in the recording medium 34.

Such a controller 10 controls the respective parts in FIG. 2 in accordance with programs and operation information transmitted from the user input unit 15. For example, the controller 10 controls an imaging operation of the imaging unit 31, processing execution commands for the image input processing unit 11, the video encoder 13, and the video decoder 14, a display operation command for the image output processing unit 12, a recording and reproduction operation command for the recording and reproducing unit 19, control such as starting, interruption, and stopping of digest image generation processing performed by the digest image generation unit 18, starting of delay processing and setting of a delay time performed by the delay processing unit 17, switching control performed by the selector unit 20, and transmission processing performed by the streaming transmission unit 21.

Figure 3:
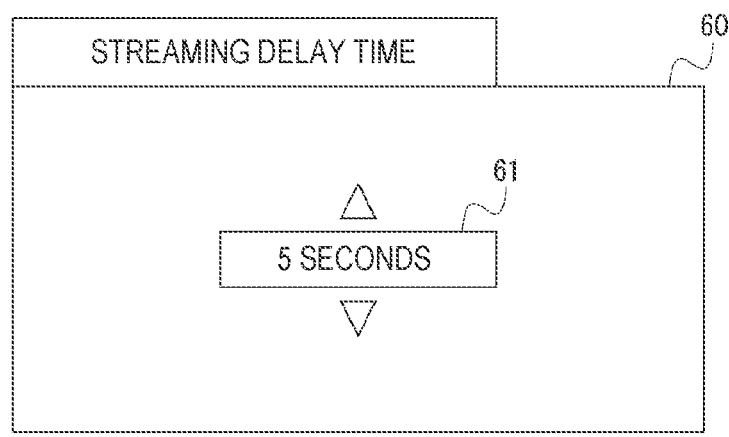
FIG. 3 is an explanatory diagram of streaming delay time setting according to the embodiment.

Note that the delay time by which the delay processing unit 17 causes the captured image to be delayed using the buffer memory 16 may be set to a certain fixed value such as 10 seconds, for example, or may be variable in accordance with some information. Alternatively, the delay time may be able to be selected by the user through an operation. For example, the controller 10 causes the display unit 32 to display a delay time setting screen 60 as illustrated in FIG. 3 in a menu screen of a camera in response to a user's operation. The user (the image-capturing person 100 or the like) selects an arbitrary delay time using a spinning button 61 and designate a delay time. In response to this designation, the controller 10 sets the delay time and controls processing performed by the delay processing unit 17.

Note that although it is typically considered that the delay time is set to a rage of about 5 seconds to 30 seconds, for example, the delay time may be able to be selected up to about 1 minutes or longer. However, it is appropriate to set a delay time within a range that is considered as being substantially in real time if distribution is performed on the assumption of streaming distribution with real time properties.

3. Image Transmission Operation

Operations of the imaging device 101 with the aforementioned configuration will be described. The imaging device 101 can streaming transmit a captured image captured by the imaging unit 31 substantially in real time and can streaming transmit a reproduced image reproduced from the recording medium 34 by the recording and reproducing unit 19.

In a case of streamlining transmitting the captured image, the delay processing unit 17 takes the captured image in the buffer memory 16 and generates a captured image with a delay in response to a command from the controller 10. Then, the captured image with a delay is supplied to the streaming transmission unit 21, and the streaming transmission is executed, by the selector unit 20 selecting the first input terminal TA in response to the command from the controller 10.

Meanwhile, the reproduced image reproduced by the recording and reproducing unit 19 is supplied directly to the second input terminal TB of the selector unit 20 without any delay. In a case of streaming transmitting the reproduced image, the reproduced image is supplied to the streaming transmission unit 21, and the streaming transmission is executed, by the selector unit 20 selecting the second input terminal TB in response to the command from the controller 10.

In the case of the embodiment, in particular, it is possible to perform urgent switching to the streaming transmission of the reproduced image in accordance with a user's operation of the image-capturing person 100 or the like during the streaming transmission of the captured image. For example, a case in which an inappropriate image is generated as a scene that is being captured corresponds to this. Note that the inappropriate image is determined by the user on the transmission side, such as the image-capturing person 100, for example, and content thereof is not referred herein. Any image corresponds to the inappropriate image as long as the image-capturing person 100 or the like considers that the image should not be transmitted.

Figure 4:
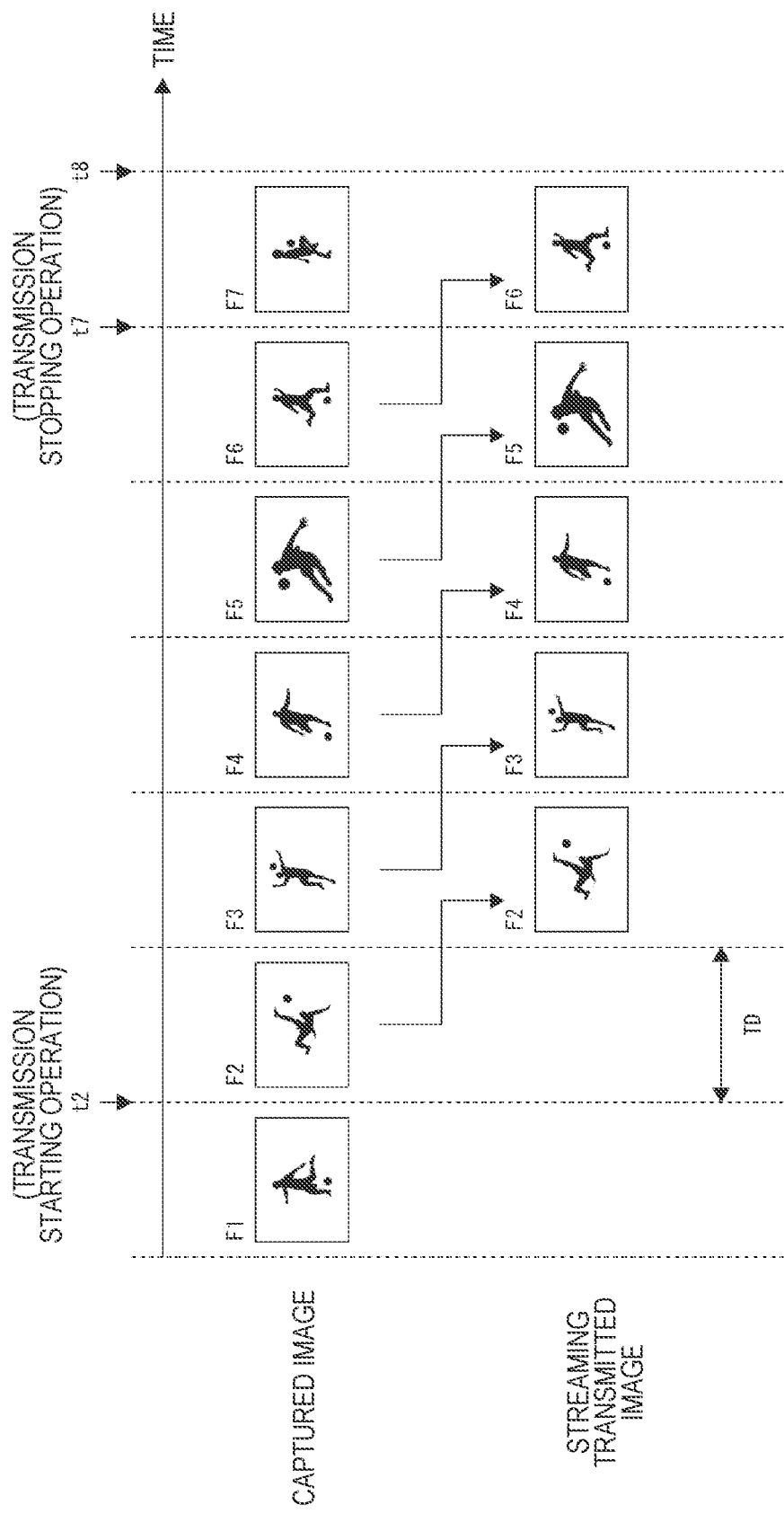
FIG. 4 is an explanatory diagram of a captured image and a transmitted image according to the embodiment.

FIG. 4 illustrates an operation transition example of a captured image and a streaming transmitted image during an ordinary time.

FIG. 4 illustrates the respective frames F1, F2, . . . of the captured image and the respective frames F2, F3, . . . of the streaming transmitted image. Intervals of the vertical broken lines in the drawing represent time intervals corresponding to a delay time TD of the delay processing unit 17. Note that the respective frames F1, F2, . . . in FIG. 4 are illustrated for convenience of description, and a time of one frame does not correspond to the delay time TD. In practice, multiple frames are present between the frame F1 and the frame F2.

If it is assumed that a transmission starting operation for providing a command to start streaming transmission is performed at a point t2, the frame F2 captured at the point and the following frames are transmitted as a streaming transmitted image with a delay of the delay time TD.

If it is assumed that a transmission stopping operation for providing a command to stop the streaming transmission is performed at a point t7, the streaming transmission is ended at a point t8 at which transmission of a frame F6 immediately before the transmission stopping operation is completed.

That is, a scene captured in a time range provided as the commands of starting/ending the transmission is delayed by the delay time TD and is streaming transmitted.

Figure 5:
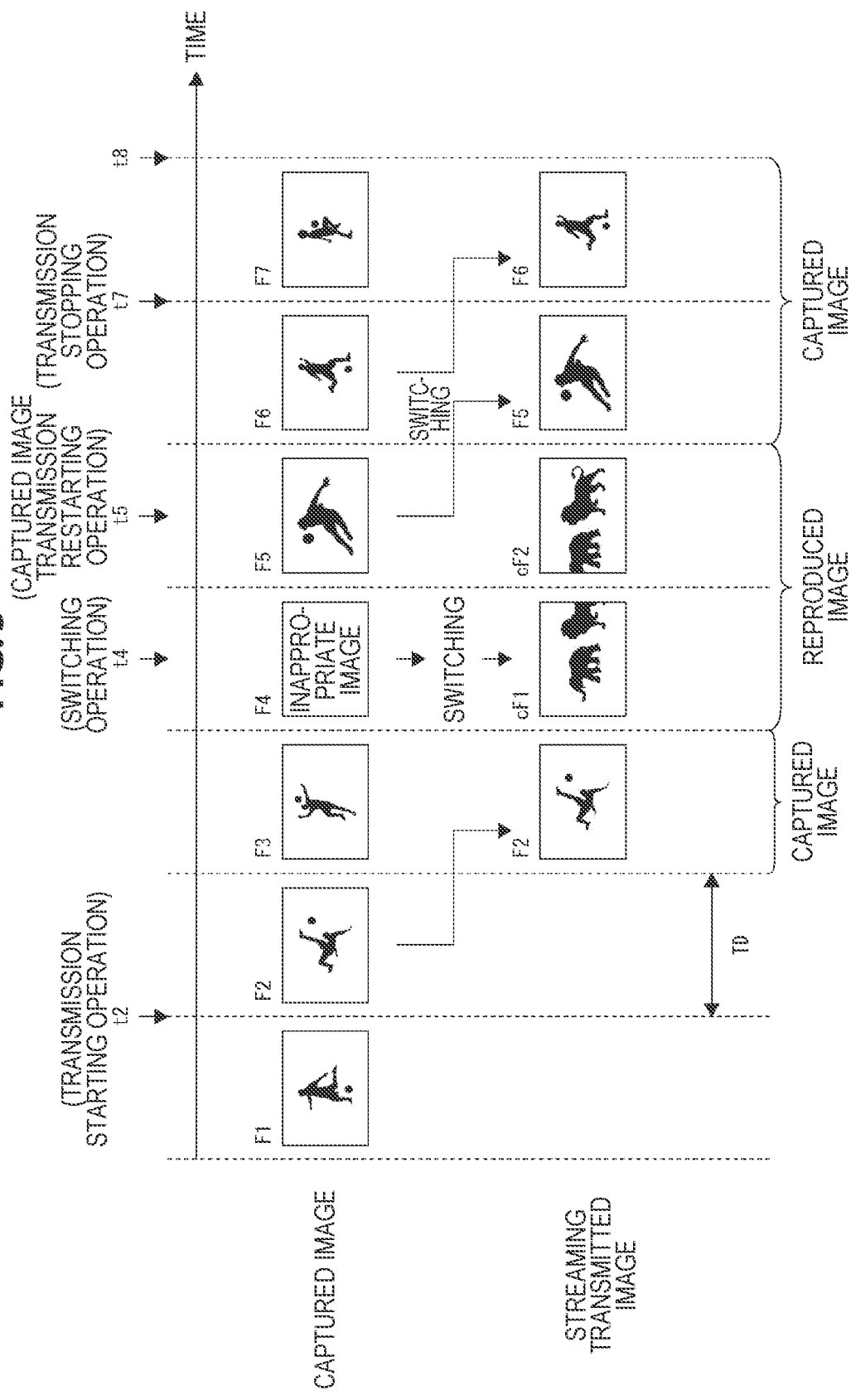
FIG. 5 is an explanatory diagram of a captured image and a transmitted image when a movie is switched according to the embodiment.

FIG. 5 illustrates a case in which an inappropriate image is generated during capturing an image.

It is assumed that a frame F4 of the captured image corresponds to the inappropriate image.

Note that the respective frames F1, F2, . . . in FIG. 5 are also basically illustrated for convenience of description similarly to FIG. 4, and this does not mean that the inappropriate image is generated only one frame in practice. In practice, a situation in which a scene that is not suitable for distribution is captured in a time length that the image-capturing person 100 can recognize, for example, a time from 1 second to 10 and several seconds is expressed with the one frame F4 in FIG. 5 for description.

If it is assumed that a transmission starting operation for providing a command to start streaming transmission is performed at the point t2, the frame F2 that is captured at the point and the following frames are regarded as the streaming transmitted image with a delay of the delay time TD.

Here, it is assumed that the image-capturing person 100 or the like notices an inappropriate scene at a certain point t4 in a plurality of frame periods over which an inappropriate image is captured as represented in the fame F4 as a representative. The image-capturing person 100 or the like can perform a switching operation at this time. Note that the "image-capturing person 100 or the like" indicates a person who is present in the surroundings of the imaging device 101 along with the image-capturing person 100 and can perform various operations.

The selector unit 20 is immediately switched to the second input terminal TB in response to the switching operation, and the movie from the recording medium 34 is reproduced by the recording and reproducing unit 19. Frames cF1 and cF2 in FIG. 5 represent the reproduced image. That is, the streaming transmitted image is immediately switched to the reproduced image in response to the switching operation at the point t4.

Then, the inappropriate image in the frame F4 is not transmitted by switching control being performed in the delay time of the delay processing unit 17 although the inappropriate image has already been captured.

In addition, the switching can immediately be performed without waiting for transmission of the frame F3 immediately before the switching operation in this case even if the frame F3 has not yet been transmitted at the point of the switching operation. Therefore, the captured image from a point that is earlier than the point t4 of the switching operation by the delay time TD is also not transmitted.

Thereafter, if a captured image transmission restarting operation is performed by the image-capturing person 100 or the like at a point t5 at which the scene that is being captured is brought into a non-inappropriate state, the frame F5 at that point and the following frames become targets of transmission. Since the captured image is delayed, the streaming transmission of the captured image from the frame F5 is restarted with a delay of the delay time TD from the point t5.

Note that the transmission of the reproduced image is continued as represented by the frame cF2 as a representative in a period before the delay time TD elapses after the point t5.

If a transmission stopping operation is performed at the point t7, the streaming transmission is ended at the point t8 at which the transmission of the frame F6 immediately before the transmission stopping operation completes.

As illustrated in FIG. 5, the captured image is replaced with the reproduced image, and the reproduced image is transmitted by the switching operation of the image-capturing person 100 or the like during the streaming transmission of the captured image. It is a matter of course that although the inappropriate scene has already been captured, it is possible not to transmit the inappropriate image since the transmission is delayed.

Figure 6:
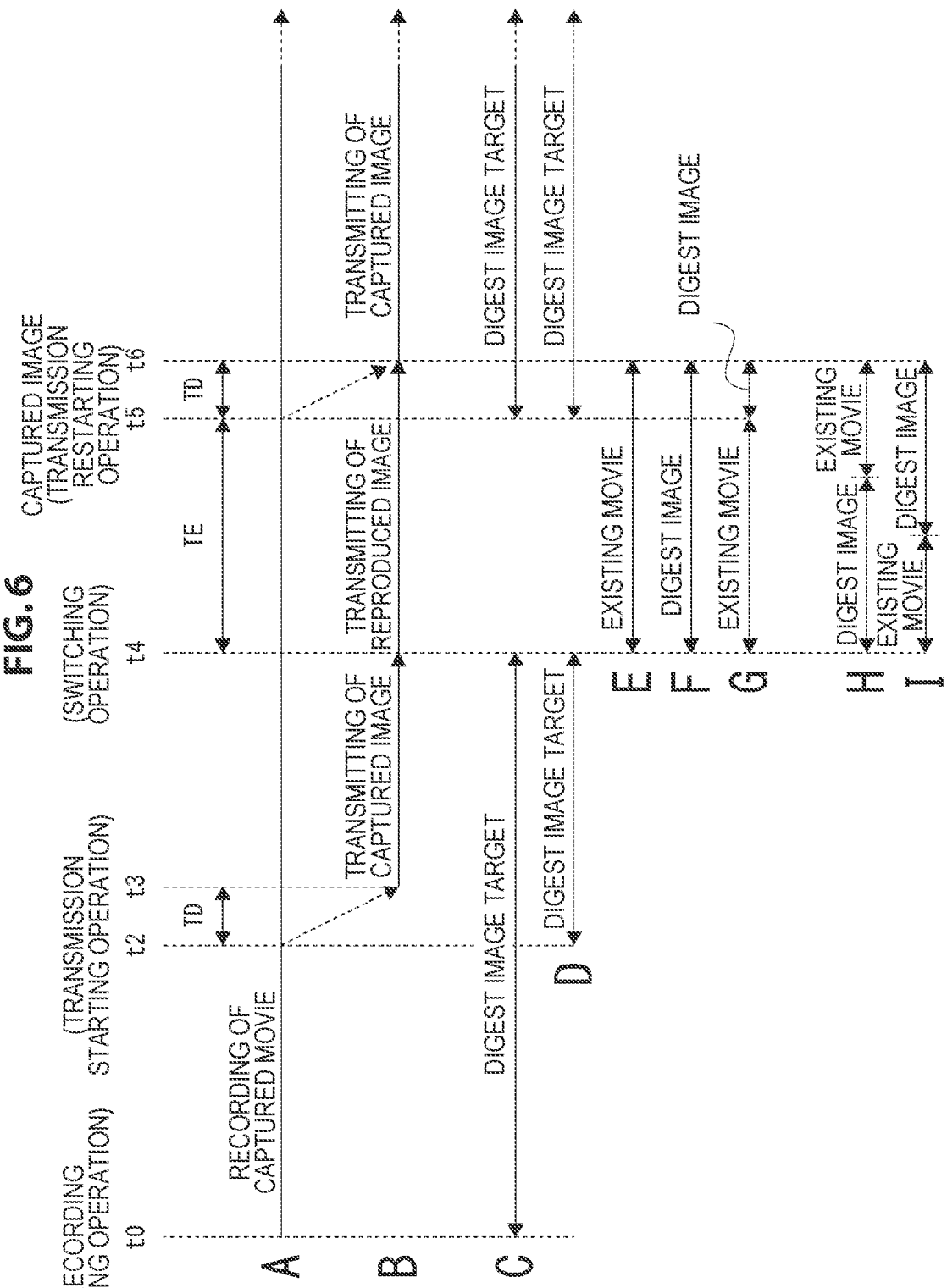
FIG. 6 is an explanatory diagram of various operation periods according to the embodiment.

FIG. 6 illustrates examples of various timings for operations from starting of the recording to restarting of the transmission of the captured image of the imaging device 101.

A point t0 represents a timing at which imaging and recording are started by the imaging device 101 through a recording starting operation of the image-capturing person 100. That is, an operation (recording of captured movie) of causing the recording and reproducing unit 19 to record the image data as the captured image that is captured by the imaging unit 31 and encoded by the video encoder 13 in the recording medium 34 is started at the point t0.

FIG. 6A illustrates a period during which the recording of the imaging operation is executed. The recording of the captured movie is continued from the point t0 to a point (not illustrated) at which the imaging and recording stopping operation is performed.

FIG. 6B illustrates a period for the streaming transmission. If a transmission starting operation is performed by the image-capturing person 100 or the like at the point t2, transmission of the captured image (first image) is started at the point t3 that is later than the point t2 by the delay time TD.

If a switching operation is performed at the point t4 due to generation of an inappropriate image, switching to the transmission of the reproduced image is immediately performed.

If a captured image transmission restarting operation is performed at the point t5, the transmission of the reproduced image is continued until the point t6 that is later than the point t5 by the delay time TD, and the transmission of the captured image is restarted at the point t6.

FIGS. 6C and 6D illustrate ranges of captured images that are targets of digest images generated by the digest image generation unit 18.

FIG. 6C is an example in which a digest image is generated using a captured image that is recorded from the point t0 at which the recording of the captured image is started. The generation of the digest image and the recording processing in the recording medium 34 can be started from the point t0.

FIG. 6D is an example in which a digest image is generated using a captured image at and after the point t2 that is a timing at which the transmission is started. The generation of the digest image and the recording processing in the recording medium 34 can be started from the point t2. In any of the cases in FIGS. 6C and 6D, the captured image in the period from the point t4 to the point t5 is not a target of the generation of the digest image. Also, the captured image at and after the point t5, that is, the captured image after the restarting of the transmission is a target of the generation of the digest image.

In the case of the example in FIG. 6C, there is a probability that an image of a scene before the starting of the streaming transmission is included in the digest image. Therefore, the example in FIG. 6C is suitable for a case in which it is desired to generate a digest image including a so-called unreleased scene.

In the case of the example in FIG. 6D, the digest image includes content within a range of the streaming transmitted. Therefore, the example in FIG. 6D is suitable for a case in which it is desired to generate a digest image within a range released through distribution.

FIGS. 6E, 6F, 6G, 6H, and 6I illustrate examples of reproduced images that are caused to replace captured images in response to a switching operation.

FIG. 6E is an example in which an existing movie recorded in the recording medium 34 is reproduced and transmitted.

As the existing movie, content designated in advance by the image-capturing person 100 or the like may be selected and reproduced, or content selected by the controller 10 in accordance with some information may be reproduced.

FIG. 6F is an example in which a digest image recorded in the recording medium 34 at that point is reproduced and transmitted. That is, FIG. 6F is an example in which a digest image generated using a captured image from the point t0 to the point t4 or a captured image from the point t2 to the point t4 is reproduced and transmitted. Note that it is not necessary to organize all digest scenes as one piece of content as the digest image. It is possible to obtain a series of digest images by forming and recording a digest image file for each extracted scene at and after the point t0 (or the point t2) and continuously reproducing the plurality of files at the time of reproduction. Therefore, it is possible to select and reproduce, at the point t4, a digest image file recorded before the point t4.

In a case in which a time length in which the digest image can be reproduced is short, it is considered to repeatedly reproduce the digest image until the transmission of the captured image is restarted.

FIG. 6G is an example in which an existing movie is reproduced and transmitted and then a digest image is reproduced and transmitted. In particular, the existing movie is reproduced/transmitted from the point t4 to the point t5 at which the captured image transmission restarting operation is performed. Then, the digest image is reproduced and transmitted from the point t5 to the point t6.

In this case, the digest image is transmitted at the point at which the restarting of the transmission of the captured image is decided, the digest image is transmitted in the delay time TD, and then the transmission of the captured image substantially in real time is started.

FIG. 6H is an example in which the digest image is reproduced and transmitted from the point t4 at which the switching operation is performed and then the switching to the existing movie is performed at a certain point. In this case, it is possible to reduce feeling of inconformity for the viewer by the digest image being reproduced/transmitted in response to a sudden switching operation, thereby switching the real time image to the digest image captured until that time.

It is possible to avoid a situation in which the digest image is just repeated many times in a case in which a reproduction time length of the digest image is short, by reproducing the existing movie at the timing at which the reproduction of the digest image ends.

FIG. 6I is an example in which an existing movie is reproduced and transmitted from the point t4 and then a digest image is reproduced and transmitted. FIG. 6I is different from FIG. 6G in that a point at which the switching to the digest image is performed is not particularly defined. For example, a case in which a digest image is reproduced and transmitted if reproduction of one content piece as an existing movie ends is assumed.

4. Processing Examples

Control processing examples of the controller 10 for the imaging device 101 performing the operations described in FIGS. 4, 5, and 6 will be described.

Figure 7:
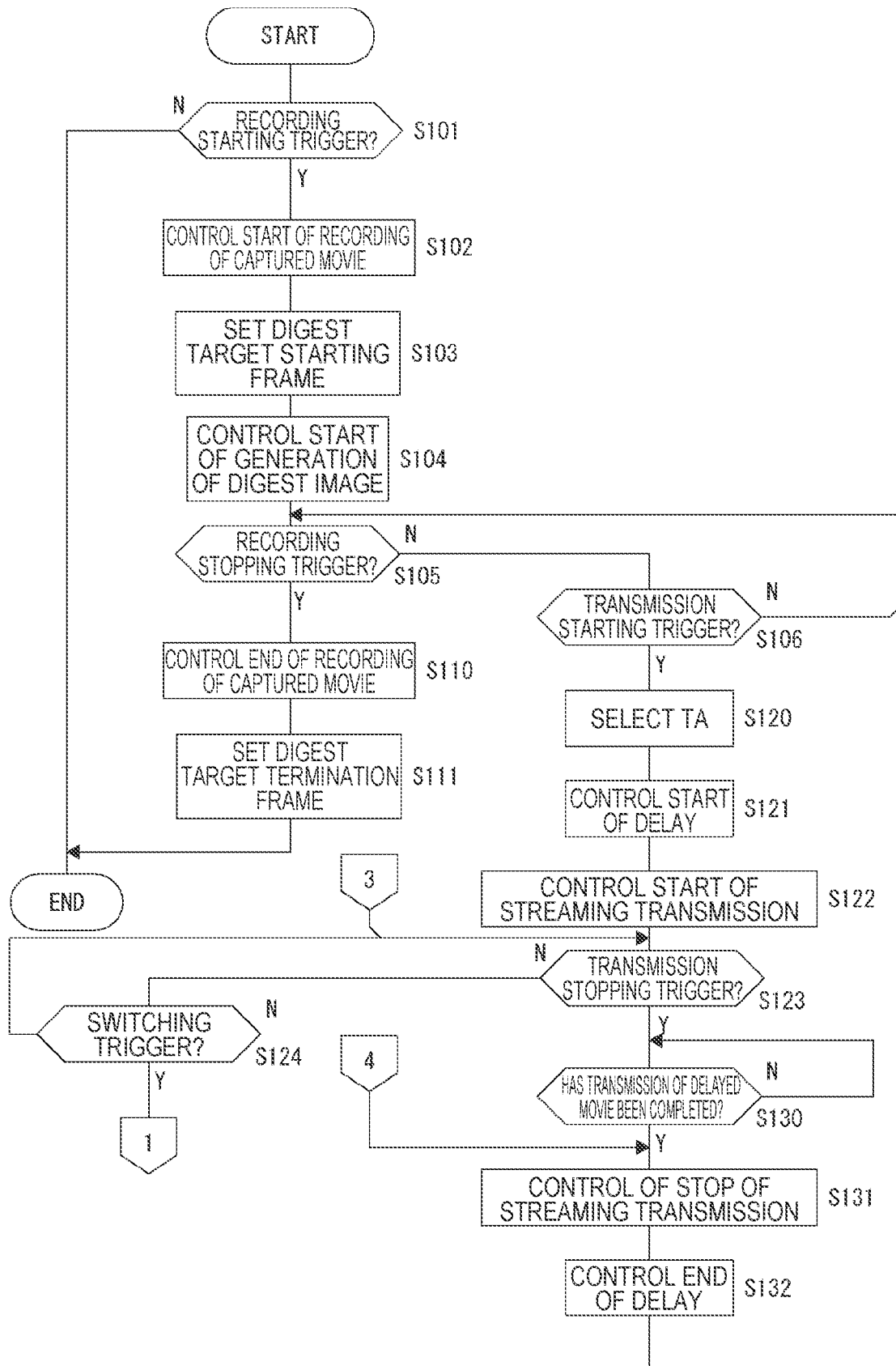
FIG. 7 is a flowchart of processing for streaming transmission according to the embodiment.

FIGS. 7 to 13 illustrate processing examples of the controller 10 for performing streaming transmission of a captured image. FIG. 7 illustrates processing from a stand-by state in which imaging using the imaging unit 31 has already been started.

The controller 10 monitors a recording starting trigger in Step S101 in FIG. 7. As one recording starting trigger, detection of a recording starting operation performed by the image-capturing person 100 or the like is exemplified. Note that in a case in which recording is automatically started using timer setting or the like, detection of a starting clock time becomes the recording starting trigger. In addition, in a case in which imaging and recording are started by a command from an external device, the command information becomes the recording starting trigger. Further, there is also a case in which the recording starting trigger is obtained as a result of detection of a condition using some sensor, image analysis of an object, or the like.

Although a transmission starting trigger, a transmission stopping trigger, a recording stopping trigger, a switching trigger, and a captured image transmission restarting trigger, which will be described later, are similarly considered in various manners, these triggers will be described as triggers based on user's operations of the image-capturing person 100 or the like herein, and various examples that can serve as triggers will be described later as modification examples.

If the recording starting trigger is detected as a recording starting operation, for example, the controller 10 advances the processing from Step S101 to S102 and performs control to start recording of the captured movie. That is, recording of the captured image in the recording medium 34 performed by the recording and reproducing unit 19 is caused to start (see the point t0 in FIG. 6).

In Step S103, the controller 10 sets a starting frame that is a target of a digest image. That is, the frame number from which the recording is started is regarded as the starting frame.

In Step S104, the controller 10 causes the digest image generation unit 18 to start generation of the digest image. Hereinafter, configuring parts of the generated digest image are successively recorded in the recording medium 34 by the recording and reproducing unit 19.

Note that the processing in Steps S103 and S104 is performed in the case of the example in FIG. 6C. In the case of the example in FIG. 6D, Steps S103 and S104 may be performed when the processing proceeds from Step S106 to S120.

In Step S105, the controller 10 monitors a recording stopping trigger.

Also, the controller 10 monitors a transmission starting trigger in Step S106.

If the transmission starting trigger caused by a transmission starting operation or the like of the image-capturing person 100 or the like is detected, the controller 10 advances from Step S106 to S120 and performs control such that the first input terminal TA is selected by the selector unit 20.

In Step S121, the controller 10 provides a command to start delay processing to the delay processing unit 17.

In Step S122, the controller 10 provides a command to start streaming transmission processing to the streaming transmission unit 21.

As described above, streaming transmission of the captured image as illustrated in FIG. 4 is started. Referring to FIG. 6, this is processing in which the transmission starting trigger is detected at the point t2, and streaming transmission is started at the point t3.

The controller 10 monitors the transmission stopping trigger in Step S123 and monitors the switching trigger in Step S124 during the streaming transmission.

In a case in which the transmission stopping trigger caused by a transmission stopping operation or the like of the image-capturing person 100 or the like is detected, the controller 10 advances from Step S123 to S130 and waits for completion of the transmission of the captured image that is being delayed. This is processing of waiting for the point t8 at which the delay time TD elapses after detecting the transmission stopping trigger at the point t7 in FIG. 4, for example.

If completion of transmission up to the frame at the point at which the transmission stopping trigger is generated is detected, the controller 10 advances from Step S130 to S131 and provides a command to stop the streaming transmission processing to the streaming transmission unit 21.

Also, the controller 10 provides a command to stop the delay processing to the delay processing unit 17 in Step S132.

As described above, the streaming transmission is stopped (see the point t8 in FIG. 4). However, recording of the captured movie is continued at this point. The controller 10 monitors a recording stopping trigger in Step S105 and monitors a transmission starting trigger in Step S106. If the transmission starting trigger is detected again, the controller 10 causes the streaming transmission to start through the processing in Steps S120, S121, and S122.

In a case in which the recording stopping trigger is detected in Step S105, the controller 10 advances to Step S110. In Step S110, the controller 10 performs control to stop recording the captured movie. That is, the controller causes the recording and reproducing unit 19 to stop the recording of the captured image in the recording medium 34 and returns the imaging device 101 to the stand-by state.

In Step S111, a termination frame as a range of a target of generation of the digest image is set. This becomes the last frame when the recording ends.

The digest image generation unit 18 basically extracts a characteristic scene using the captured image in a range from the starting frame set in Step S104 to the termination frame set in Step S111 and generates the digest image.

Note that the digest image generation processing performed by the digest image generation unit 18 is appropriately ended at the point at which the generation is completed. It is only necessary for the controller 10 to recognize the completion of the generation on the basis of a notification of the end from the digest image generation unit 18, for example.

Figure 8:
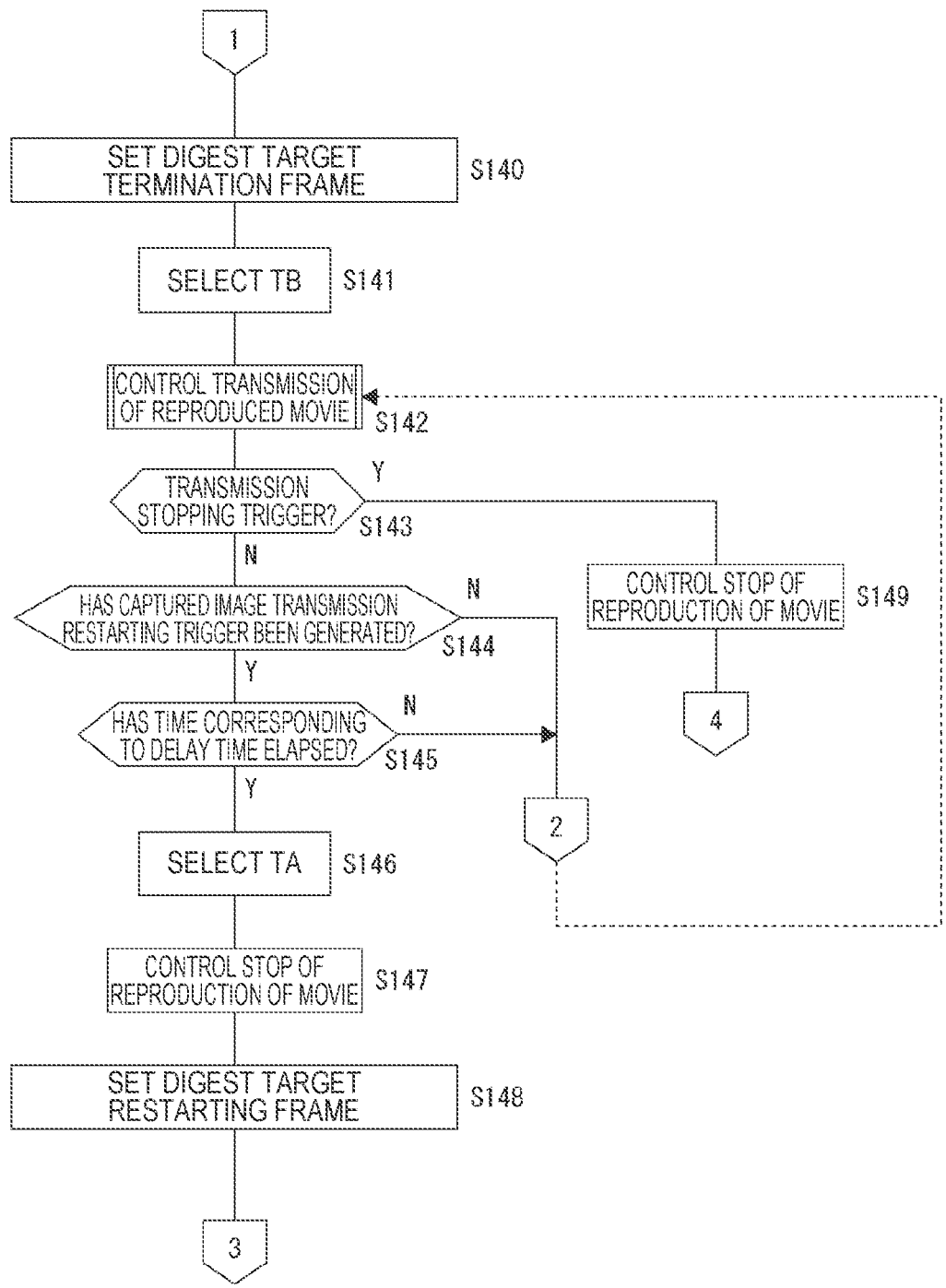
FIG. 8 is a flowchart of processing for streaming transmission according to the embodiment.

In a case in which a switching trigger based on a switching operation of the image-capturing person 100 or the like, for example, is detected during the streaming transmission, the controller 10 advances from Step S124 to Step S140 in FIG. 8. At this point, the controller 10 sets the termination frame as a range of a target of generation of the digest image. The frame of the captured image at the point t4 in FIG. 6A corresponds to this.

The digest image generation unit 18 generates the digest image in the range from the starting frame set in Step S103 to the termination frame set in Step S140.

Note that since there is a probability that the frame at the point t4 is an inappropriate image in practice, it is desirable to set a frame that is earlier than the point at which the switching trigger is generated (point t4) by a predetermined time (for example, five seconds, ten seconds, or the like) to be the termination frame as the range of the target of the generation of the digest image. This is for further reducing the probability that an inappropriate image part is included in the digest image.

In Step S141, the controller 10 performs control such that the selector unit 20 selects the second input terminal TB. Then, the controller 10 performs reproduced movie transmission control in Step S142. Here, the recording and reproducing unit 19 provides a command to reproduce movie content from the recording medium 34. In this manner, a state in which the reproduced image is transmitted is achieved at and after the point t4 in FIG. 6B.

During the transmission of the reproduced image (from the point t4 to the point t6 in FIG. 6B), the controller 10 monitors a transmission stopping trigger in Step S143. Also, the controller 10 monitors whether or not the captured image transmission restarting trigger has already been generated in Step S144.

In a case in which the transmission stopping trigger is detected, the controller 10 performs movie reproduction stopping control in Step S149. That is, the recording and reproducing unit 19 causes the reproduction of the movie content from the recording medium 34 to stop. Then, the processing returns to Step S131 in FIG. 7, a command to stop the streaming transmission processing is provided to the streaming transmission unit 21, a command to stop delay processing is provided to the delay processing unit 17 in Step S132, and the processing returns to a monitoring loop in Steps S105 and S106.

The aforementioned case is a case in which the image-capturing person 100 or the like gives up restarting the transmission of the captured image, for example, and performs the transmission stopping operation during the transmission of the reproduced image.

Figure 9:
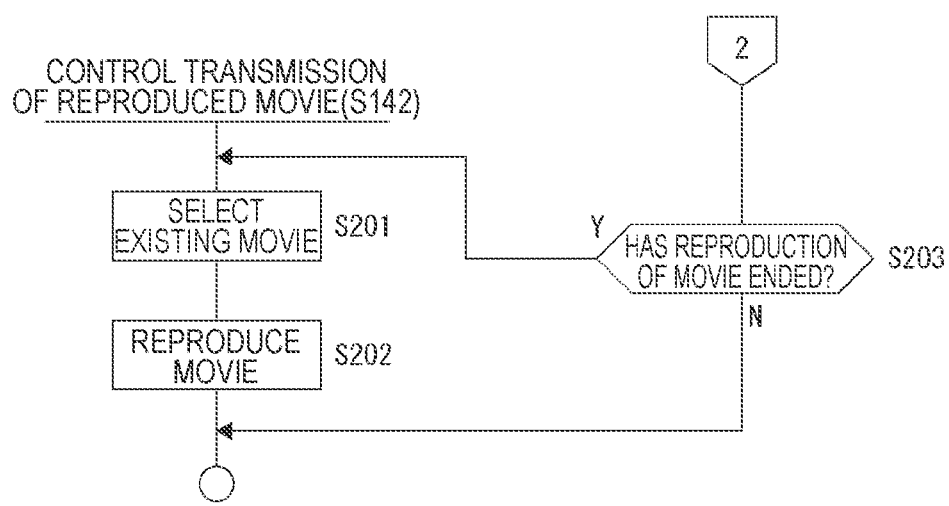
FIG. 9 is a flowchart of reproduced movie transmission processing according to the embodiment.
Figure 12:
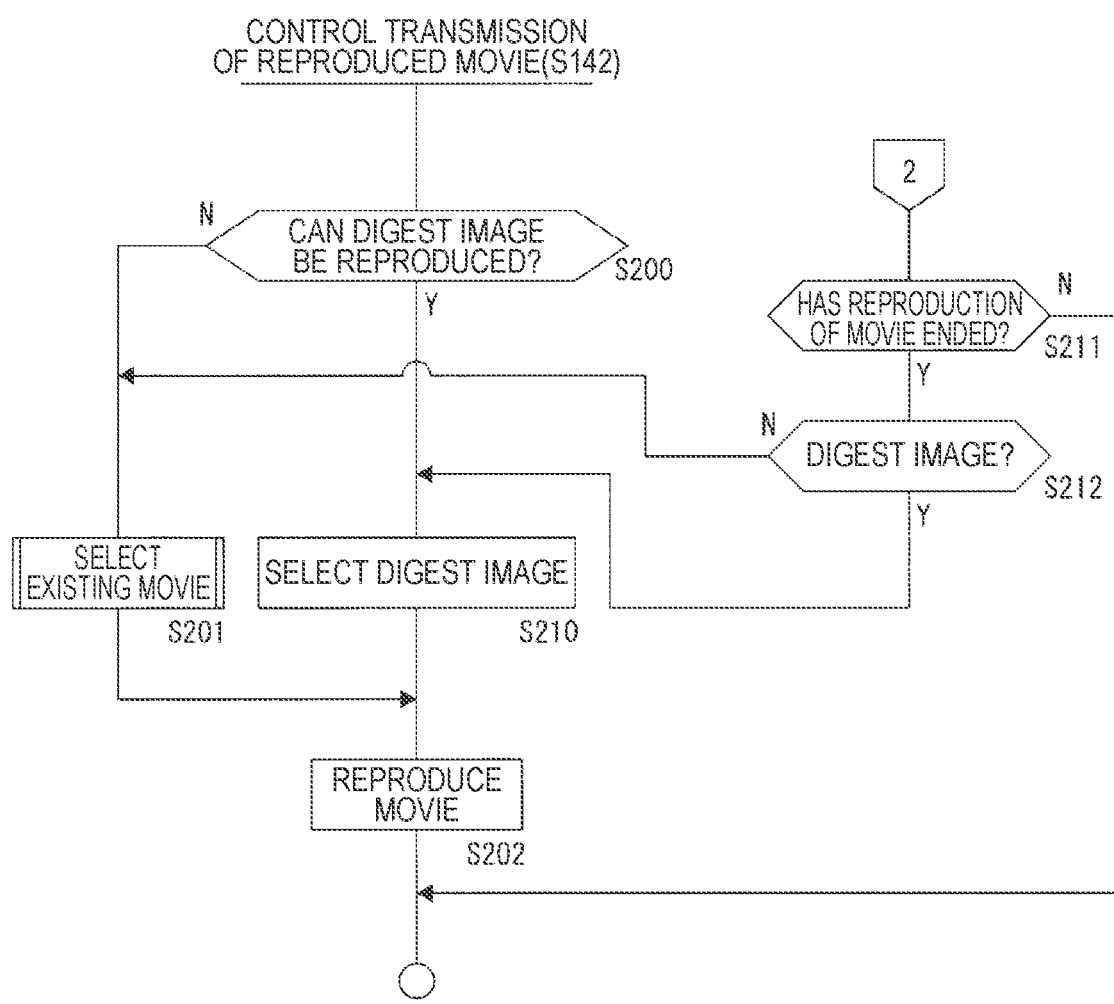
FIG. 12 is a flowchart of reproduced movie transmission processing according to the embodiment.
Figure 13:
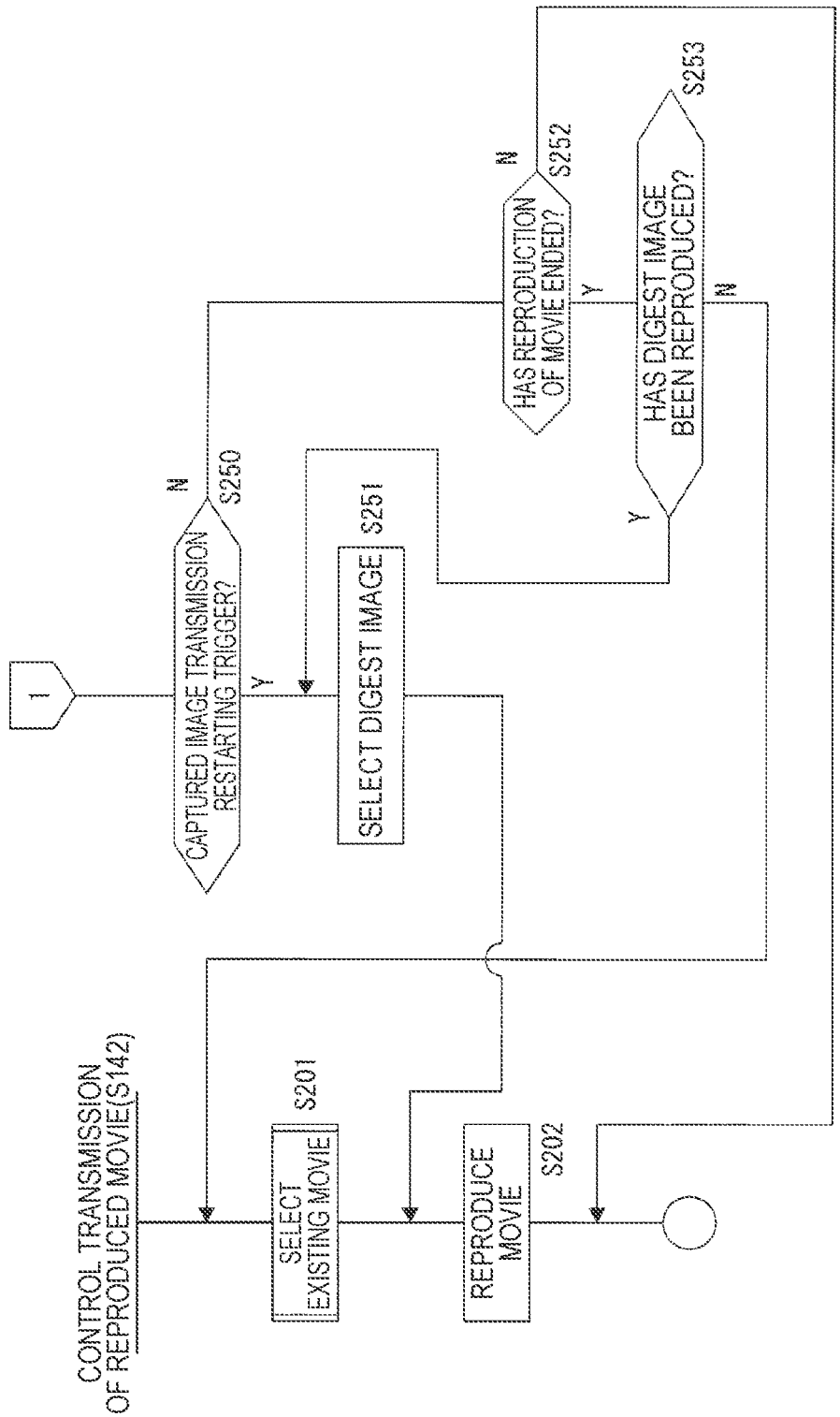
FIG. 13 is a flowchart of reproduced movie transmission processing according to the embodiment.

If the transmission stopping trigger is not detected and the captured image transmission restarting trigger has not already been generated during the transmission of the reproduced image, the processing returns to Step S142 as illustrated in FIG. 9, 12, or 13, which will be described later.

Also, it is determined in Step S144 that the captured image transmission restarting trigger has already been generated, after the captured image transmission restarting operation is detected at a certain point. In this case, it is confirmed whether or not a time corresponding to the delay time has elapsed after the captured image transmission restarting trigger is generated in Step S145. If the time has not elapsed, the processing returns to Step S142. That is, this corresponds to a period during which the transmission of the reproduced image continues since the delay time has not elapsed after the captured image transmission restarting trigger is generated. This corresponds to the period from the point t5 to the point t6 in FIG. 6B.

Thereafter, if it is confirmed that the delay time has elapsed after the captured image transmission restarting trigger is generated, the controller 10 advances from Step S145 to Step S146 and performs control such that the first input terminal TA is selected by the selector unit 20.

In Step S147, the controller 10 causes the recording and reproducing unit 19 to stop the reproduction of the movie from the recording medium 34.

In addition, the controller 10 sets a restarting frame of the range of the target of the generation of the digest image in Step S148. This is the frame from which the transmission is restarted at the point t6 (the frame captured at the point t5). The digest image generation unit 18 also uses the captured image in a range from the restarting frame to the termination frame that is then set in Step S111 or S140 to generate the digest image.

Since the processing returns to the captured image streaming transmission state with the aforementioned processing, the controller 10 returns to the monitoring loop in Steps S123 and S124 in FIG. 7.

Here, an example of the control of the transmission of the reproduced movie in Step S142 in FIG. 8 will be described.

FIG. 9 is an example of the control of the transmission of the reproduced movie in Step S142.

The controller 10 selects an existing movie in Step S201 in FIG. 9. That is, the controller 10 selects one of movie content pieces recorded in the recording medium 34. Then, the controller 10 provides a command to reproduce the selected existing movie to the recording and reproducing unit 19 in Step S202.

In this manner, the existing movie is reproduced and is then streaming transmitted.

The controller 10 performs the processing in Step S142 while performing the monitoring processing in Steps S143, S144, and S145 during the transmission of the reproduced image as described above, and when Step S142 is repeated, the controller 10 confirms whether or not the reproduction of the movie content that is being reproduced has ended in the processing in Step S203 in FIG. 9. If the end of the reproduction has not been reached, the reproduction of the movie is caused to continue as it is, and the processing proceeds to the monitoring processing in Steps S143, S144, and S145.

When reproduction of certain movie content ends, the controller 10 advances from Step S203 to Step S201 and selects an existing movie again. Then, the controller 10 provides a command to reproduce the selected existing movie to the recording and reproducing unit 19 in Step S202. In this manner, existing movies are successively reproduced and are streamlining transmitted.

FIG. 9 described above is a processing example in a case in which one or a plurality of existing movies is transmitted as reproduced images as in FIG. 6E. The length of the period during which the streaming transmission of the captured image is interrupted and the captured image is replaced with the reproduced image is not clear since the length depends on an operation of the image-capturing person 100 or the like. Therefore, one or a plurality of existing movies is selected and reproduced.

Various methods of selecting the existing movies in Step S201 in FIG. 9 can be conceived, and some examples thereof will be listed.

Figure 10A:
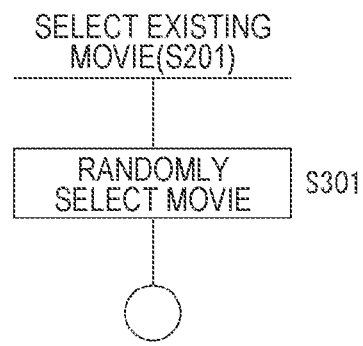
FIGS. 10A and 10B are flowcharts of existing movie selection processing according to the embodiment.

FIG. 10A is an example in which the controller 10 randomly select movie content in Step S301.

Figure 10B:
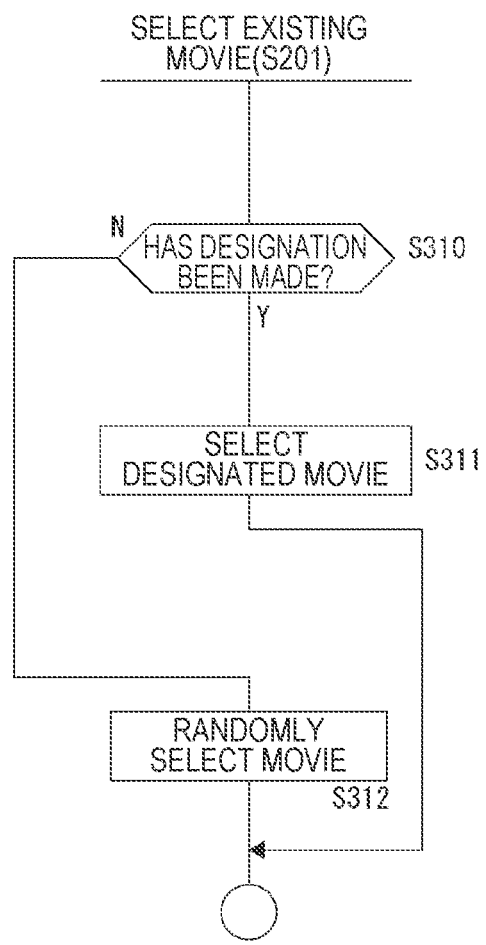

FIG. 10B is an example in which the image-capturing person 100 or the like can select movie content that is transmitted as an alternative in advance. In a case in which the image-capturing person 100 or the like has selected movie content that is transmitted as an alternative at the time of a switching operation through an operation performed on a setting menu or the like, for example, the movie content is selected.

The controller 10 confirms whether or not movie content has been designated in advance by the image-capturing person 100 or the like in Step S310. If the movie content has been designated, then the designated movie content is selected in Step S311. If no movie content has been designated, movie content is randomly selected in Step S312.

In a case in which urgent switching is performed due to generation of an inappropriate image in this manner, the movie content designated by the image-capturing person 100 or the like in advance is reproduced and transmitted. The image-capturing person 100 or the like can choose appropriate movie content in an alternative image of the captured image that is being distributed. In a case in which an event such as a wedding ceremony is imaged and distributed, for example, it is possible to prevent a feeling of inconformity from being given to the viewer in a case in which the switching to the reproduced image is performed if movies that conform to an image of the wedding ceremony have been selected in advance.

Figure 11:
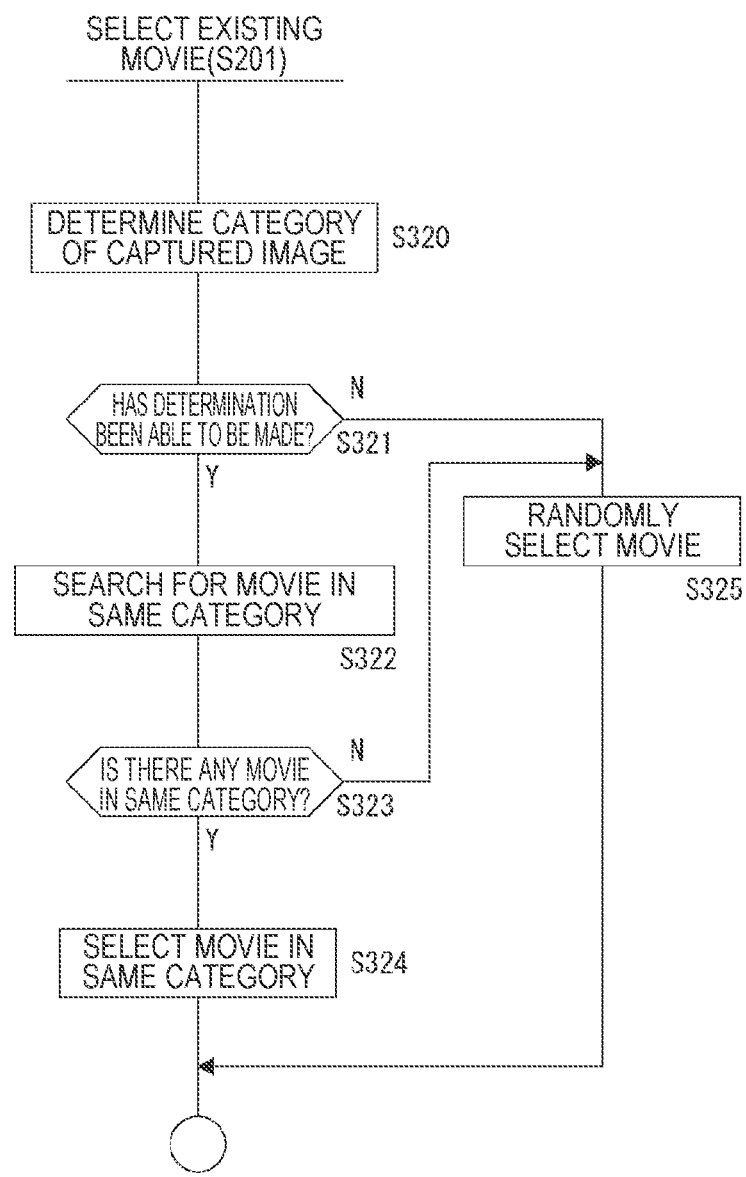
FIG. 11 is a flowchart of existing movie selection processing according to the embodiment.

FIG. 11 is an example in which the controller 10 selects movie content that conforms to a captured image that is being distributed.

The controller 10 determines a category of the captured image in Step S320. For example, the controller 10 determines a category such as a sport, a natural landscape, an event such as a wedding ceremony, or a music event. Note that actual determination processing may be performed using image analysis or the like from a point at which recording is started.

In Step S321, it is confirmed whether or not the category has successfully been determined. In a case in which the category is not clear, the processing proceeds to Step S325, and movie content is randomly selected.

In a case in which the category has successfully been determined, the controller 10 advances to Step S322 and searches for movie content to which information of the same category has been applied in the movie content recorded in the recording medium 34. Note that in order to do this, it is assumed that category information has respectively been applied to the movie content recorded in the recording medium 34.

If movie content in a category common to that of the captured image is extracted, the controller 10 advances from Step S323 to Step S324 and selects movie content in the common category as movie content to be reproduced. Note that in a case in which a plurality of movie content pieces in the common category is extracted, one of the movie content pieces may be selected.

If no movie content in the common category is recorded in the recording medium 34, the controller 10 advances from Step S323 to S325 and randomly selects movie content.

By selecting such existing movies, it is possible to increase a probability that the reproduced image that does not give the viewer a significant feeling of inconformity can be transmitted when the switching to the reproduced image is performed.

Then, another example of the reproduced movie transmission processing in Step S142 in FIG. 8 will be described with reference to FIG. 12. This is a processing example in consideration of reproduction of a digest image.

The controller 10 determines whether or not it is possible to reproduce the digest image in Step S200 in FIG. 12. That is, it is confirmed that one or more digest image files has been generated and recorded in the recording medium 34 at the current point.

If it is not possible to reproduce the digest image, the controller 10 selects an existing movie in Step S201. That is, one of movie content pieces recorded in the recording medium 34 is selected by a method as illustrated in FIG. 10A, 10B, or 11. Then, a command to reproduce the selected existing movie is provided to the recording and reproducing unit 19 in Step S202.

In this manner, the existing movie is reproduced and streaming transmitted as illustrated in FIG. 6E.

Meanwhile, if it is possible to reproduce the digest image, the controller 10 selects the digest image in Step S210. Then, the controller 10 provides a command to reproduce the selected digest image to the recording and reproducing unit 19 in Step S202.

In this manner, the digest image is reproduced and streaming transmitted as illustrated in FIG. 6F.

The controller 10 performs the processing in Step S142 while performing the monitoring processing in Steps S143, S144, and S145 in FIG. 8 during the transmission of the reproduced image as described above, and the controller 10 confirms whether or not the reproduction of the movie content (the existing movie or the digest image) that is being reproduced has ended in the processing in Step S211 in FIG. 12 when Step S142 is repeated. If the reproduction has not reached its end, the reproduction of the movie is caused to continue as it is, and the processing proceeds to the monitoring processing in Steps S143, S144, and S145.

When reproduction of certain movie content ends, the controller 10 advances from Step S211 to Step S212 and branches processing depending on which of the digest image and the existing movie the image that has been reproduced is.

If the existing movie has been reproduced until then, the controller 10 advances to Step S201 and selects an existing movie again. Then, the controller 10 provides a command to reproduce the selected existing movie to the recording and reproducing unit 19 in Step S202. Therefore, existing movies are successively reproduced and streaming transmitted (FIG. 6E).

Also, if the digest image has been reproduced until then, the controller 10 advances to Step S210 and selects the digest image again. If a plurality of digest image files is recorded, the digest image files may be successively selected, or the same digest image may be selected again. Then, the controller 10 provides a command to reproduce the selected digest image to the recording and reproducing unit 19 in Step S202. Therefore, the digest image is successively reproduced and streaming transmitted (FIG. 6F).

Next, yet another example of the reproduced movie transmission processing in Step S142 in FIG. 8 will be described with reference to FIG. 13. FIG. 13 is a processing example in which the example in FIG. 6G is realized.

The controller 10 selects an existing movie in Step S201 in FIG. 13. That is, one of the movie content pieces recorded in the recording medium 34 is selected by the method as illustrated in FIG. 10A, 10B, or 11. Then, the controller 10 provides a command to reproduce the selected existing movie to the recording and reproducing unit 19 in Step S202.

In this manner, the existing movie is reproduced and streaming transmitted. This corresponds to the state at and after the point t4 in FIG. 6E.

The controller 10 performs the processing in Step S142 while performing the monitoring processing in Steps S143, S144, and S145 during the transmission of the reproduced image as described above, and when Step S142 is repeated, the controller 10 monitors the captured image transmission restarting trigger in Step S250 in FIG. 13.

In a period before the captured image transmission restarting trigger is generated, it is confirmed whether or not the reproduction of the existing movie that is being reproduced has ended in Step S252. If the reproduction has not ended, the reproduction of the movie is caused to continue as it is, and the processing proceed to the monitoring processing in Steps S143, S144, and S145.

Also, when the reproduction of the movie content ends, the controller 10 advances from Step S252 to Step S253 and branches processing depending on which of the digest image and the existing movie has been reproduced. At this time, the existing movie has been reproduced, the controller 10 selects the existing movie again in Step S201. Then, the controller 10 provides a command to reproduce the selected existing movie to the recording and reproducing unit 19 in Step S202. In this manner, one or a plurality of existing movies is reproduced and streaming transmitted in the period from the point t4 to the point t5 in FIG. 6.

If the captured image transmission restarting trigger is detected, the controller 10 advances from Step S250 to S251 and selects a digest image. Then, the controller 10 provides a command to reproduce the selected digest image to the recording and reproducing unit 19 in Step S202.

In this manner, the digest image is reproduced and streaming transmitted at and after the point t5 in FIG. 6G.

Thereafter, the processing in FIG. 13 is repeated until elapse of a time corresponding to the delay time is confirmed in Step S145 in FIG. 8, and in that case, the controller 10 advances from Step S250 to Step S252 and confirms whether or not the reproduction of movie content as the digest image that is being reproduced has ended. If the reproduction has not ended, the reproduction of the movie is caused to continue as it is, and the processing proceeds to the monitoring processing in Steps S143, S144, and S145.

Also, when the reproduction of the movie content ends, the controller 10 advances from Step S252 to Step S253, and since the digest image has been reproduced until then in this case, the controller 10 selects the digest image again in Step S251. Then, the controller 10 provides a command to reproduce the selected digest image to the recording and reproducing unit 19 in Step S202.

In this manner, one or a plurality of digest images is reproduced and streaming transmitted in the period from the point t5 to the point t6 in FIG. 6.

5. Other Examples of Image Transmission Apparatus

Next, an example in which the imaging device 101A and the image transmission apparatus 107 are used will be described as another embodiment with reference to FIG. 14. That is, this is an example in which the image transmission apparatus 107 streaming transmits a captured image captured by the imaging device 101A.

Figure 14:
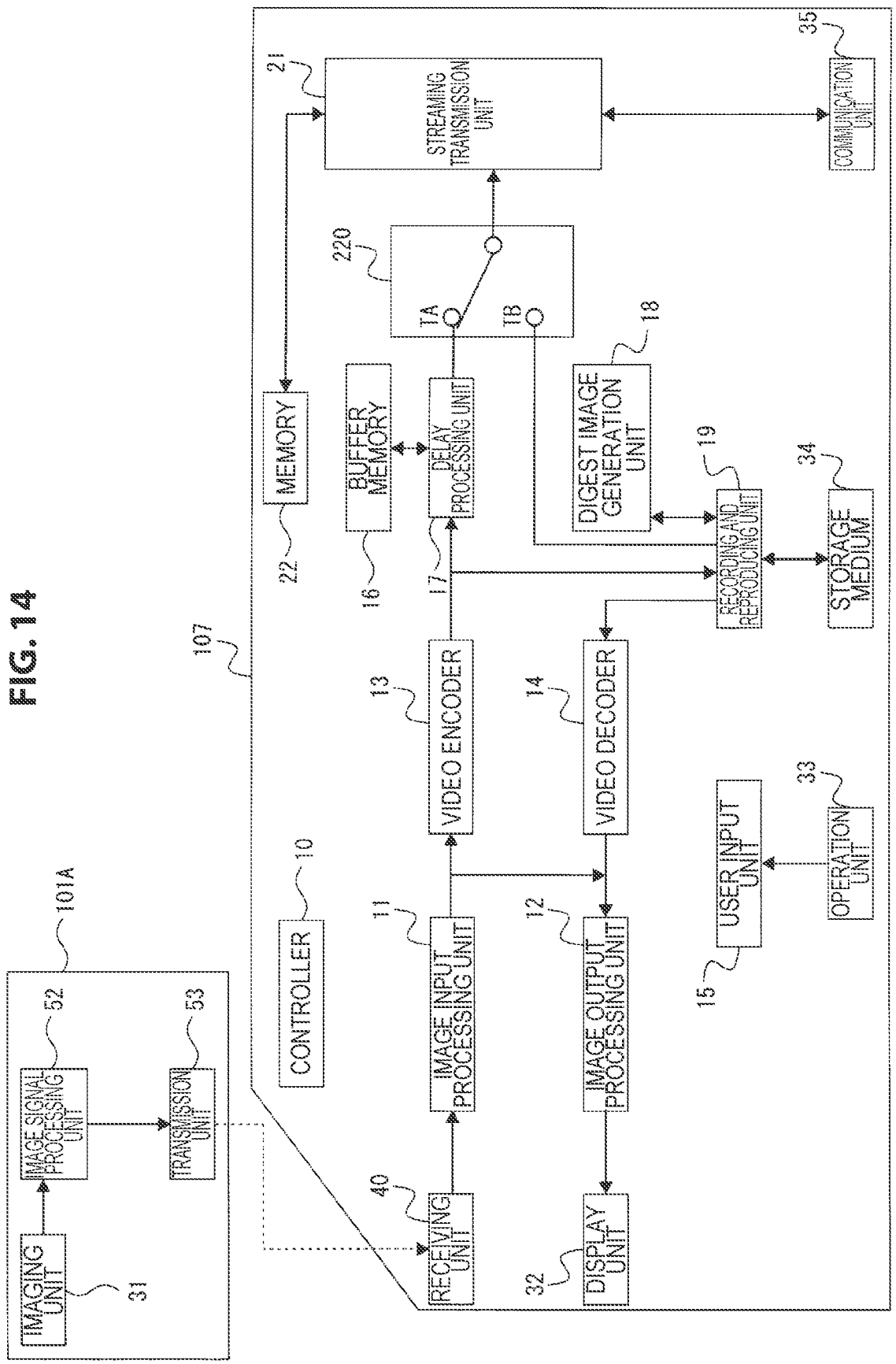
FIG. 14 is a block diagram of an image transmission apparatus that is provided separately from the imaging device according to the embodiment.

As illustrated in FIG. 14, the imaging device 101A has an imaging unit 31, an image signal processing unit 52, and a transmission unit 53.

The image signal processing unit 52 performs necessary signal processing on a captured image signal captured by the imaging unit 31 and supplies the captured image signal to the transmission unit 53.

The transmission unit 53 performs encoding and transmission processing for transmitting the captured image signal processed by the image signal processing unit 52 to the image transmission apparatus 107.

Note that a communication scheme between the transmission unit 53 and a receiving unit 40 of the image transmission apparatus 107 may be wired connection communication or may be near-field wireless communication, for example, infrared communication, or wireless communication of standards such as WIFI (registered trademark) or Bluetooth (registered trademark).

The image transmission apparatus 107 receives the captured image signal from the imaging device 101A by the receiving unit 40 and supplies the captured image signal to the image input processing unit 11.

A configuration of the image transmission apparatus 107 is a configuration that is substantially similar to that of the imaging device 101 in FIG. 2, the same reference numerals will be given to the same configuration parts, and description thereof will be omitted.

That is, the image transmission apparatus 107 can streaming transmit the captured image captured by the imaging device 101A provided as a separate body. At that time, the captured image is caused to be delayed for a predetermined time and is transmitted by the delay processing unit 17. In addition, switching to the streaming transmission of the reproduced image from the recording medium 34 is performed in response to a switching trigger. That is, it is possible to perform operations similar to those of the aforementioned imaging device 101.

The image transmission apparatus 107 may be formed as a dedicated device, may be a PC, a smartphone, or the like, and may realize functions of the respective parts illustrated in the drawing using application software.

With such a configuration, it is possible to perform network distribution by supplying the captured image to the image transmission apparatus 107 even if the imaging device 101A that does not have the network distribution function is used, which is effective to prevent an inappropriate image from being distributed.

6. Conclusions and Modification Examples

The following advantages can be obtained in the aforementioned embodiments.

The image transmission apparatus (the imaging device 101 in FIG. 2 or the image transmission apparatus 107 in FIG. 14) according to the embodiments has the delay processing unit 17 that causes a captured image (first image) as a movie to be transmitted to be delayed for a predetermined time. Also, the image transmission apparatus has the recording and reproducing unit 19 (reproduction unit) capable of reproducing a reproduced image (second image) as a movie to be transmitted from the recording medium 34.

In addition, the image transmission apparatus has the streaming transmission unit 21 that streaming transits an image signal selected by the selector unit 20 as the transmission unit that transmits the image.

In addition, the image transmission apparatus includes a control unit that switches the first image to the second image reproduced by the recording and reproducing unit 19 and transmits the second image if a switching trigger is detected during transmission of the first image that is delayed by the delay processing unit 17. Specifically, the image transmission apparatus includes, as the control unit, the controller 10 that performs control such that the controller 10 causes the selector unit 20 to select the first input terminal TA, causes the streaming transmission unit 21 to execute streaming transmission of the captured image delayed by the delay processing unit 17, and causes the selector unit 20 to select the second input terminal TB in accordance with detection of the switching trigger.

In this case, it is possible to transmit the captured image that does not significantly damage real-time properties in the streaming transmission (network distribution) of the captured image.

Then, the movie to be transmitted is switched from the captured image to the reproduced image in accordance with generation of the switching trigger caused by a user's operation of the image-capturing person 100 or the like. In this manner, it is possible to prevent an inappropriate scene from being transmitted in advance by the image-capturing person 100 or the like performing a switching operation in a case in which there is a scene that is inappropriate to be transmitted as image content of the captured image.

In particular, in a case in which an inappropriate image that may lead to a broadcasting accident is captured when a captured image is being streaming-distributed in real time, it is possible to avoid distribution of the inappropriate image with a room in accordance with decision of the image-capturing person 100 or the like since the captured image is being transmitted with a delay time to some extent.

In addition, although the captured image that the viewer is viewing is suddenly interrupted, the viewer is brought into a state in which the viewer can view the movie as the reproduced image and thus does not mistake the state as malfunction or the like of the device with which the viewer viewing the movie, for example. Also, the viewer can enjoy the movie during the interruption of the captured image.

In addition, the imaging device 101 according to the embodiments includes the imaging unit 31 and transits a movie (captured image) captured by the imaging unit 31 as the first image. That is, a mode in which the imaging device 101 such as a video camera is used as the image transmission apparatus and a captured image is transmitted as it is can be realized.

In this manner, a real-time distribution operation of the imaging device 101 becomes possible.

In addition, in that case, it is possible to prevent the inappropriate scene from being transmitted in advance regardless of the transmission having real-time properties by the image-capturing person 100 or the like performing a switching operation in a case in which an inappropriate scene is generated as a scene that is being captured, for example.

In particular, the image-capturing person 100 can reliably and quickly discover the inappropriate scene since the person is carefully looking at the object. In Addition, it is possible to immediately perform the switching operation when the inappropriate scene is discovered and to properly prevent the inappropriate scene from being transmitted since the imaging device 101 that the image-capturing person 100 uses has functions as the image transmission apparatus.

In the embodiments, the control is performed such that the selector unit 20 is caused to select the reproduced image (see S124 in FIGS. 7 and S141 and S142 in FIG. 8) without waiting for completion of transmission up to the frame of the captured image immediately before detection of the switching trigger (that is, immediately without waiting for completion of the transmission up to the frame F3 in FIG. 5) in response to the detection of the trigger as described above in FIG. 5.

Since the captured image is delayed and transmitted, it is considered that the transmission up to the frame immediately before the timing at which the switching trigger is generated has not yet been completed at the timing at which the switching trigger is detected. Specifically, the transmission up to the frame immediately before the timing at which the switching trigger is generated is not completed if the time corresponding to the delay time TD does not elapsed from the point at which the switching trigger is generated.

However, switching to the transmission of the reproduced image is immediately performed in response to the detection of the switching trigger without waiting for the transmission of the unsent frame in the embodiments.

In a case in which the image-capturing person 100 or the like notices an inappropriate scene in the captured image and performs a switching operation, for example, it is not necessarily obvious from which point the inappropriate scene has been generated. Since this also depends on scene content, it is difficult to determine the point at which the inappropriate scene has started. In other words, there is a high probability that frames before the point at which the switching trigger is generated also correspond to the inappropriate image.

Further, since it is considered that the image-capturing person 100 or the like often performs the switching operation after recognizing the inappropriate image, it is reasonable to consider that the scene captured immediately before the point of the switching operation is also an inappropriate image.

Thus, the switching to the reproduced image (second image) is immediately performed at the timing of the switching trigger. In this manner, transmission of the image immediately before the timing of the switching trigger, specifically transmission of the image that takes place earlier by a time corresponding to the delay time TD is stopped. In this manner, it is possible to more reliably prevent the inappropriate image from being transmitted.

In addition, although there are assumed to be cases in which the user notices the inappropriate scene with a delay or the user also performs an operation with a delay in a case in which a user's operation is employed as a trigger, there is an advantage that it is possible to cover the delay of noticing and the delay of the operation to some extent since the transmission of the captured image before the trigger timing is also stopped.

In the embodiments, the controller 10 performs control such that the selector unit 20 is caused to select the captured image (see Steps S144, S145, and S146 in FIG. 8 and FIG. 5) at the point at which the delay time TD has elapsed from the detection of the captured image transmission restarting trigger in response to the detection of the trigger.

Since the captured image is delayed and transmitted, the image of the frame captured at the point before the captured image transmission restarting trigger is transmitted if the selector unit 20 selects the first input terminal TA immediately at the timing at which the captured image transmission restarting trigger is detected. If the switching to the captured image is immediately performed at the time of the transmission restarting trigger, the scene captured before the point of the transmission starting trigger is transmitted for a longer time as the delay time of the delay processing unit 17 increases. Then, a probability that an inappropriate scene is included also occurs.

Control is performed such that the captured image is selected by the selector unit 20 after waiting for the delay time in order to prevent such a situation, and the captured image (first image) from the scene at the point after the captured image transmission restarting trigger is generated is transmitted. In this manner, it is possible to prevent an inappropriate scene from being transmitted by an influence of the delay time.

In addition, no problem occurs at the time of the restarting even if the delay processing is continued by employing such a countermeasure, and it is possible to simplify the operation of the controller 10 without requiring stopping and restarting of the delay processing.

It is a matter of course that it is only necessary to transmit the reproduced image as in the period during which the delay time is waited. That is, the reproduction stopping control is performed at the point of Step S147 in FIG. 8 after the selector unit 20 is switched to the first input terminal TA. In this manner, it is possible to prevent a situation in which no movie is displayed on the viewer side from occurring.

In the embodiments, the example in which the digest image generation unit 18 that generates a digest image of the captured image (first image) and causes the recording medium 34 to store the digest image is provided, and the controller 10 causes the recording and reproducing unit 19 to reproduce the digest image in a case in which the selector unit 20 is caused to select the reproduced image (second image) in response to the switching trigger (see FIGS. 6F, 6G, 6H, 6I, 12, and 13).

In this manner, the digest image is delivered to the viewer when the captured image (first image) is switched to the reproduced image (second image) due to generation of an inappropriate scene or the like. Therefore, it is possible to obtain a state in which the viewer can naturally continue viewing without having any feeling of inconformity against switching from the viewing content provided until then.

When an inappropriate scene occurs in the real-time captured image, for example, the viewer views the digest image of the captured image captured until then and is brought into a state in which the user continues the viewing without significantly noticing the occurrence of the inappropriate scene.

In the embodiments, the digest image is generated from the captured image by excluding the captured mage in a period from the point at which the switching trigger is detected to the point at which the captured image transmission restarting trigger is detected. That is, the captured image in the period during which the transmission is stopped is not included in the digest image as illustrated in FIGS. 6C and 6D (see Steps S103 and S111 in FIG. 7 and Steps S140 and S148 in FIG. 8).

In this manner, the digest image of the captured image can be adapted not to include an inappropriate scene or the like in the captured image, and it is possible to generate a digest image with content appropriate as content to be distributed.

In the embodiments, the example in which the digest image is generated using the captured image at and after the frame from which the recording in the recording medium 34 is started with reference to FIG. 6C has been described.

The recording of the captured image is started at a point at which appropriate imaging is started prior to the transmission, for example. That is, it is possible to estimate that the recording of the captured image is started after the point at which the imaging of a scene that is valuable to be recorded is started. Therefore, it is possible to generate the digest image by collecting characteristic scenes within an appropriate range by generating the digest image using the captured image at and after the point at which the recording is started. In a case in which the recording of the captured image has been started prior to the transmission of the captured image, a case in which the viewer can view a part of a scene that has not been transmitted, and a digest image including a so-called unreleased image can be generated.

In the embodiments, the example in which the digest image is generated using the captured image at and after the frame as a target of the streaming transmission has been described with reference to FIG. 6D.

That is, a digest image that includes only the content that is determined to be appropriate as transmission content is obtained by generating the digest image within a range of the transmission target. Then, it is possible to generate the digest image in accordance with the transmission content.

In the embodiments, the example in which the recording and reproducing unit 19 is caused to reproduce the existing movie stored in advance in the recording medium 34 in a case in which the selector unit 20 is caused to select the reproduced image in response to the switching trigger has been described (see FIGS. 6E, 6G, 6H, and 6I).

In this manner, the existing movie is delivered to the viewer when the captured image (first image) is switched to the reproduced image (second image) due to occurrence of an inappropriate scene or the like. Inappropriate transmission is avoided by preparing the appropriate existing movie in advance.

Appropriate movie content is transmitted as an alternative in accordance with intent of the image-capturing person 100 or the like by the image-capturing person 100 or the like designating the existing movie to be reproduced in advance. For example, it is possible to distribute a movie with no feeling of inconformity as an alternative.

In addition, the viewer can enjoy the reproduced image during the distribution of the reproduced image.

In the embodiments, the example in which the controller 10 causes the recording and reproducing unit 19 to reproduce an existing movie selected as a result of comparing category information determined from the image content of the captured image with category information of each existing movie in a case in which a plurality of existing movies is respectively stored with the category information and the controller 10 causes the selector unit 20 to select the reproduced image in accordance with the switching trigger has been described (see FIG. 11).

In this manner, the existing movie selected in accordance with the content of the captured image is reproduced as the second image. Therefore, switching to a movie that has totally different content or an excessively different mood is not provided, which does not give a feeling of inconformity to the viewer. In a case in which switching to the second image is performed due to generation of an inappropriate scene when a sport game is being captured and transmitted, an existing movie as a sport movie is reproduced and transmitted. Therefore, the viewer does not easily feel awkwardness due to the switching to the representative image.

Note that although the example in which an existing movie with conforming category information in the comparison is selected has been described, an existing movie with a category that is similar to the category of the captured image may be selected.

In the embodiment, the example in which the control is performed such that the recording and reproducing unit 19 is caused to reproduce the digest image after causing it to reproduce the existing movie in the period during which the selector unit 20 is caused to select the reproduced image as in FIGS. 6G and 6I has been described.

In this manner, the inappropriate scene in the captured image is replaced with the existing movie and the digest image. It is possible to smoothly feel connection when the transmission of the captured image is restarted by employing the digest image as a second half of the reproduced image. Although the captured image is suddenly switched to the existing movie for the viewer, awkwardness is reduced, and the viewer can easily return to the viewing of the following captured image since the digest image is reproduced after the sudden switch and the viewer shifts to the current captured image after remembering the content of the captured image reproduced until then.

In the embodiments, the example in which the digest image is reproduced by the recording and reproducing unit 19 in the period from the point t5 at which the captured image transmission restarting trigger is detected to the point t6 at which the delay time TD of the delay processing unit elapses from the detection of the transmission restarting trigger as in FG. 6G has been described (see FIG. 13).

In this manner, the digest image is transmitted in the second half of the period during which the reproduced image is transmitted, in particular, the period immediately before the transmission of the captured image is restarted. Therefore, the viewer views a distributed image that has switched from the digest image to a real-time captured image, for example. Therefore, a smooth feeling of viewing with no conformity is obtained when the transmission of the captured image is restarted. In addition, in a case in which the delay time is as long as about thirty seconds or one minute, for example, a time until the transmission of the captured image is actually restarted from the captured image transmission restarting trigger becomes about thirty seconds or one minute. The viewer can remember the scene before the interruption and can enjoy the restarted viewing by being able to view the digest image during this time.

Incidentally, although the example in which the recording starting trigger, the transmission starting trigger, the transmission stopping trigger, the recording stopping trigger, the switching trigger, and the captured image transmission restarting trigger are operation inputs of the image-capturing person 100 or the like has been described in the embodiments, various examples of triggers can be considered.

In a case in which the recording starting trigger that is monitored in Step S101 in FIG. 7 automatically start recording using time setting or the like, for example, detection of a clock time of the start becomes the recording starting trigger. Also, in a case in which imaging and recording are started in response to a command from an external device, the command information becomes the recording starting trigger. Further, in a case in which imaging and recording are started in response to detection of a situation using some sensor or a result of image analysis or the like of an object, these detection signal and result signal can obtain recording starting triggers in some cases.

The transmission starting trigger that is monitored in Step S106 is similar to this. A trigger using timer setting, a trigger employing a command from an external device, a trigger using a situation detection signal obtained by a sensor or through captured image analysis are considered.

The transmission stopping trigger and the recording stopping trigger are similar to this.

Since the switching trigger and the captured image transmission restarting trigger respond to determination of an inappropriate scene, a user's operation is typically assumed. However, it is also possible to automatically determine the inappropriate scene through image analysis.

For example, specific scene characteristics, specific object shapes, and other inappropriate image conditions are registered. Image analysis of the captured image is performed for each frame or each intermittent frames, it is determined whether or not the captured image meets the registered inappropriate image conditions, it is determined whether or not the captured image is an inappropriate image, and the switching trigger or the captured image transmission restarting trigger is generated.

For example, this can be applied to a case in which there is a requirement that it is desired that a specific mark, a face of a specific individual, or the like is not distributed.

Note that the example in which the reproduction of the recording and reproducing unit 19 is started when the switching trigger is generated has been described in the embodiments, reproduction may be executed at a point at which the switching trigger is not generated. In that case, the controller 10 can perform switching to the transmission of the alternative image only by switching the selector unit 20 to the second input terminal TB when the switching trigger is generated.

In addition, the length of the period during which the streaming transmission of the captured image is interrupted and the captured image is replaced with the reproduced image is not clear since the length is in accordance with the operation of the image-capturing person 100 or the like. A situation in which the transmission of the reproduced image continues with no end is also assumed. Thus, processing of forcibly ending the streaming transmission if transmission of the reproduced image continues for a certain upper limit time.

Although the embodiments are described as operation examples in the case in which the captured image that is being currently captured is transmitted substantially in real time, the technology of the present disclosure can also be applied to a case in which the reproduced image is streaming transmitted.

For example, certain reproduced content is reproduced and streaming transmitted. In this case, the reproduced content is delayed and transmitted. It is assumed that a person who transmits the image discovers an image that is not suable for distribution in the reproduced image during the streaming transmission. Switching to transmission of other movie content is performed by performing a switching operation at this time.

The present technology is also effective in such a case. That is, the first mage may be an image of a reproduced image signal in some cases.

A program according to an embodiment of the invention is a program that causes the controller 10 in the image transmission apparatus including the delay processing unit 17 that causes the first image to be delayed for a predetermined time, the recording and reproducing unit 19 that reproduces the second image, and the streaming transmission unit 21 that transmits images to execute the processing in FIGS. 7 and 8.

That is, the program according to the embodiment is a program that causes a control device (controller 10) in the imaging device 101 or the image transmission apparatus 107 to execute a procedure (S120, S121, and S122) of causing the selector unit 20 to select the captured image, thereby causing the streaming transmission unit 21 to execute the streaming transmission of the captured image delayed by the delay processing unit 17, a procedure (S124) of detecting the switching trigger, and a procedure (S141 and S142) of causing the selector unit 20 to select the reproduced image in response to detection of the switching trigger and causing the streaming transmission unit 21 to execute the streaming transmission after performing switching to the reproduced image reproduced by the recording and reproducing unit 19.

Such a program makes it easy to realize the imaging device 101 and the image transmission apparatus 107 according to the embodiments.

In addition, such a program can be stored in advance in a recording medium that is incorporated in a device such as a computer device or a ROM or the like in a microcomputer that has a CPU. Alternatively, the program can be temporally or permanently saved (stored) in a removable recording medium such as a semiconductor memory, a memory card, an optical disc, a magnetooptical disc, or a magnetic disk. In addition, such a removable recording medium can be provided as so-called packaged software.

Also, such a program can be installed from a removable recording medium to a personal computer or the like and can also be downloaded from a download site via a network such as a LAN or the Internet.

Note that the advantages described in the specification are described just for illustrative purposes and are not intended to be limited, and there may be other advantages.

Additionally, the present technology may also be configured as below.

(1)
An image transmission apparatus including:
a delay processing unit that causes a first image to be delayed by a predetermined time;
a reproduction unit that reproduces a second image;
a transmission unit that transmits an image; and
a control unit that performs switching from the first image to the second image that is reproduced by the reproduction unit and causes the second image to be transmitted if a switching trigger is detected while the first image that is caused to be delayed by the delay processing unit is being transmitted.

(2)
The image transmission apparatus according to (1), including:
an imaging unit,
in which the first image is an image that is captured by the imaging unit.

(3)
The image transmission apparatus according to (1) or (2), in which the control unit performs control such that switching to the second image is performed and the second image is caused to be transmitted without waiting for completion of transmission of a frame of the first image immediately before the switching trigger is detected in accordance with the detection of the trigger.

(4)
The image transmission apparatus according to any of (1) to (3), in which the control unit performs control such that the control unit performs switching to the first image and causes the first image to be transmitted at a time point when a delay time of the delay processing unit has elapsed after detection of a transmission restarting trigger for the first image in accordance with the detection of the transmission restarting trigger.

(5)
The image transmission apparatus according to any of (1) to (4), including:
a digest image generation unit that generates a digest image for the first image and causes a recording medium to store the digest image,
in which the control unit causes the reproduction unit to reproduce the digest image in a period during which the second image is caused to be transmitted in accordance with the switching trigger.

(6)
The image transmission apparatus according to (5), in which the digest image is generated from the first image excluding a period from a time point at which the switching trigger is detected to a time point at which a transmission restarting trigger for the first image is detected.

(7)
The image transmission apparatus according to (5) or (6), in which processing of recording the first image in a recording medium is performed, and
the digest image is generated using the first image after a frame of which the recording in the recording medium is started.

(8)
The image transmission apparatus according to (5) or (6), in which the digest image is generated using the first image after a frame that is a target of transmission by the transmission unit.

(9)
The image transmission apparatus according to any of (1) to (4), in which the control unit causes the reproduction unit to reproduce an existing movie that is recorded in advance in the recording medium in a case in which the control unit performs switching to the second image and causes the second image to be transmitted in accordance with the switching trigger.

(10)
The image transmission apparatus according to (9), in which a plurality of existing movies is respectively stored together with pieces of category information, and
the control unit causes the reproduction unit to reproduce an existing movie that is selected depending on a result of comparing a piece of category information determined from image content of the first image with the pieces of category information of the respective existing movies in a case in which the control unit performs switching to the second image and causes the second image to be transmitted in accordance with the switching trigger.

(11)
The image transmission apparatus according to any of (5) to (8), in which the control unit performs control such that the control unit causes the reproduction unit to reproduce an existing movie that is stored in advance in the recording medium and then causes the reproduction unit to reproduce the digest image in a period during which the second image is caused to be transmitted.

(12)
The image transmission apparatus according to (5) to (8), in which the control unit performs control such that the digest image is being reproduced by the reproduction unit in a period from a time point at which the transmission restarting trigger for the first image is detected to a time point at which a delay time of the delay processing unit has elapsed from the detection of the transmission restarting trigger.

(13)
An image transmission method of an image transmission apparatus including
a delay processing unit that causes a first image to be delayed by a predetermined time,
a reproduction unit that reproduces a second image, and
a transmission unit that transmits an image,
the image transmission method executing:
a procedure of causing the first image that is delayed by the delay processing unit to be transmitted;
a procedure of detecting a switching trigger; and
a procedure of performing switching to the second mage that is reproduced by the reproduction unit and causing the second image to be transmitted in accordance with the detection of the switching trigger.

(14)
A program that causes a control device in an image transmission apparatus including
a delay processing unit that causes a first image to be delayed by a predetermined time,
a reproduction unit that reproduces a second image, and
a transmission unit that transmits an image,
to execute:
a procedure of causing the first image that is delayed by the delay processing unit to be transmitted;
a procedure of detecting a switching trigger; and
a procedure of performing switching to the second image that is reproduced by the reproduction unit and causing the second image to be transmitted in accordance with the detection of the switching trigger.

REFERENCE SIGNS LIST 10 controller
11 image input processing unit
12 image output processing unit
13 video encoder
14 video decoder
15 user input unit
16 buffer memory
17 delay processing unit
18 digest image generation unit
19 recording and reproducing unit
20 selector unit
21 streaming transmission unit
22 memory
31 imaging unit
32 display unit
33 operation unit
34 recording medium
35 communication unit
40 receiving unit
52 image signal processing unit
53 transmission unit
100 image-capturing person
101, 101A imaging device
102 network
103 distribution management server
104 terminal apparatus
107 image transmission apparatus

The invention claimed is:

1. An image transmission apparatus, comprising:
a memory configured to store an existing movie; and
a central processing unit (CPU) configured to:
 delay a first image by a specific time;
 generate a digest image for the first image;
 store, in the memory, the generated digest image;
 transmit the delayed first image;
 reproduce a second image;
 switch from the first image to the second image;
 detect a switching trigger during the transmission of the delayed first image;
 transmit the second image in a first period based on the switching trigger detected during the transmission of the delayed first image;
 reproduce the stored digest image and the stored existing movie in the first period in which the second image is transmitted, wherein
  the first period includes a second period and a third period,
  the reproduction of the stored digest image is after the reproduction of the stored existing movie; and
 detect a transmission restarting trigger for the first image, wherein
  the stored existing movie is reproduced in the second period from a time point at which the switching trigger is detected to a time point at which the transmission restarting trigger for the first image is detected,
  the stored digest image is reproduced in the third period from the time point at which the transmission restarting trigger for the first image is detected to a time point at which a delay time has elapsed after the detection of the transmission restarting trigger for the first image, and
  the digest image is generated from the first image excluding the second period.

2. The image transmission apparatus according to claim 1, further comprising a camera configured to capture the first image.

3. The image transmission apparatus according to claim 1, wherein the CPU is further configured to transmit the second image without waiting for completion of transmission of a frame of the first image immediately before the switching trigger is detected.

4. The image transmission apparatus according to claim 1, wherein the CPU is further configured to:
switch to the first image; and
transmit the first image at the time point at which the delay time has elapsed after the detection of the transmission restarting trigger for the first image.

5. The image transmission apparatus according to claim 1, wherein
the CPU is further configured to record, in the memory, a frame of the first image, and
the digest image is generated from the first image after the record of the frame of the first image is started.

6. The image transmission apparatus according to claim 1, wherein the digest image is generated from the first image after a frame of the first image that is a target of transmission.

7. The image transmission apparatus according to claim 1, wherein
the memory is further configured to store a plurality of existing movies together with a plurality of pieces of category information, and
the CPU is further configured to:
 determine a piece of category information from image content of the first image;
 compare the determined piece of category information with the stored plurality of pieces of category information;
 select the existing movie from the stored plurality of existing movies based on a result of the comparison;
 reproduce the selected existing movie in a case in which the CPU switches to the second image; and
 transmit the reproduced existing movie based on the switching trigger.

8. An image transmission apparatus, comprising:
a memory; and
a central processing unit (CPU) configured to:
 delay an image by a specific time;
 generate a digest image for the image;
 store, in the memory, the generated digest image;
 transmit the delayed image;
 reproduce the stored digest image;
 switch from the image to the reproduced digest image;
 detect a switching trigger during the transmission of the delayed image; and transmit the digest image based on the switching trigger detected during the transmission of the delayed image,
  wherein the digest image is reproduced in a period from a time point at which a transmission restarting trigger for the image is detected to a time point at which a delay time has elapsed from the detection of the transmission restarting trigger.

9. An image transmission method, comprising:
  delaying a first image by a specific time;
  generating a digest image for the first image;
  storing, in a memory, the generated digest image and an existing movie;
  transmitting the delayed first image;
  reproducing a second image;
  switching from the first image to the second image;
  detecting a switching trigger during the transmission of the delayed first image;
  transmitting the second image in a first period based on the switching trigger detected during the transmission of the delayed first image;
  reproducing the stored digest image and the stored existing movie in the first period in which the second image is transmitted, wherein
    the first period includes a second period and a third period,
    the reproduction of the stored digest image is after the reproduction of the stored existing movie; and
  detecting a transmission restarting trigger for the first image, wherein
    the stored existing movie is reproduced in the second period from a time point at which the switching trigger is detected to a time point at which the transmission restarting trigger for the first image is detected,
    the stored digest image is reproduced in the third period from the time point at which the transmission restarting trigger for the first image is detected to a time point at which a delay time has elapsed after the detection of the transmission restarting trigger for the first image, and
    the digest image is generated from the first image excluding the second period.

10. A non-transitory computer-readable medium having stored thereon computer-executable instructions, which when executed by a processor of an image transmission apparatus, cause the processor to execute operations, the operations comprising:
  delaying a first image by a specific time;
  generating a digest image for the first image;
  storing, in a memory, the generated digest image and an existing movie;
  transmitting the delayed first image;
  reproducing a second image;
  switching from the first image to the second image;
  detecting a switching trigger during the transmission of the delayed first image;
  transmitting the second image in a first period based on the switching trigger detected during the transmission of the delayed first image;
  reproducing the stored digest image and the stored existing movie in the first period in which the second image is transmitted, wherein
    the first period includes a second period and a third period,
    the reproduction of the stored digest image is after the reproduction of the stored existing movie; and
  detecting a transmission restarting trigger for the first image, wherein
    the stored existing movie is reproduced in the second period from a time point at which the switching trigger is detected to a time point at which the transmission restarting trigger for the first image is detected,
    the stored digest image is reproduced in the third period from the time point at which the transmission restarting trigger for the first image is detected to a time point at which a delay time has elapsed after the detection of the transmission restarting trigger for the first image, and
    the digest image is generated from the first image excluding the second period.

* * * * *